(12) United States Patent
Boduch et al.

(10) Patent No.: US 8,320,409 B2
(45) Date of Patent: Nov. 27, 2012

(54) METHODS AND APPARATUS FOR IMPROVED COMMUNICATIONS NETWORKS

(75) Inventors: Mark E. Boduch, Geneva, IL (US);
Chris R. Zettinger, Wheaton, IL (US);
Charles R. Parilla, Batavia, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1204 days.

(21) Appl. No.: 10/631,479

(22) Filed: Jul. 31, 2003

(65) Prior Publication Data
US 2004/0105451 A1 Jun. 3, 2004

Related U.S. Application Data

(60) Provisional application No. 60/400,136, filed on Jul. 31, 2002, provisional application No. 60/400,228, filed on Jul. 31, 2002.

(51) Int. Cl.
*H04J 3/06* (2006.01)
*H04B 10/00* (2006.01)
(52) U.S. Cl. .................... 370/503; 370/222; 398/155
(58) Field of Classification Search .............. 370/216, 370/221–228, 395.62, 503–519; 359/110, 359/117, 119, 128; 398/1–24, 154, 155
See application file for complete search history.

(56) References Cited

U.S. PATENT DOCUMENTS

| 5,253,254 A | 10/1993 | Roberts et al. |
| 5,285,441 A | 2/1994 | Bansal et al. |
| 5,490,147 A | 2/1996 | Kubo |
| 6,047,004 A | 4/2000 | Koyama |
| 6,163,549 A * | 12/2000 | Bortolini et al. ............. 370/503 |
| 6,295,146 B1 * | 9/2001 | Nathan et al. .................. 398/50 |
| 6,370,159 B1 * | 4/2002 | Eidson ......................... 370/503 |
| 6,600,742 B1 * | 7/2003 | Hiromori et al. ............ 370/376 |
| 6,667,954 B1 | 12/2003 | Boduch et al. |
| 6,839,858 B1 * | 1/2005 | James et al. .................. 713/400 |
| 6,895,189 B1 * | 5/2005 | Bedrosian .................... 398/155 |
| 6,966,009 B1 | 11/2005 | Boduch |
| 7,042,835 B1 * | 5/2006 | de Boer et al. ............... 370/222 |
| 7,193,964 B2 * | 3/2007 | Courtney et al. ............. 370/228 |
| 7,197,249 B2 * | 3/2007 | DeCusatis et al. ........... 398/154 |

(Continued)

FOREIGN PATENT DOCUMENTS
WO WO 2004/002369 2/2004
(Continued)

OTHER PUBLICATIONS

Series G: Transmission Systems and Media, Digital Systems and Networks, ITU-T Recommendation G.841, XP000955617, International Telecommunications Union, Oct. 1998.

(Continued)

*Primary Examiner* — Habte Mered
(74) *Attorney, Agent, or Firm* — Hamilton, Brook, Smith & Reynolds, P.C.

(57) ABSTRACT

Erroneous data due to faults are prevented from propagating through a distributed network node having diversely routed communications links by using a fault masking technique that eliminates the 60 ms of error propagation time associated with SONET networks. The fault masking technique can also prevent random bit errors from propagating through the distributed network node. A frame alignment technique used in the network node is scalable for very wide words (e.g., 128 bits) for use with high speed optical communications protocols, such as OC-192.

35 Claims, 38 Drawing Sheets

U.S. PATENT DOCUMENTS

| | | | |
|---|---|---|---|
| 7,242,861 B2 * | 7/2007 | Sato et al. | 398/19 |
| 7,272,739 B1 | 9/2007 | Boduch | |
| 7,289,435 B2 * | 10/2007 | Yehuda et al. | 370/222 |
| 7,660,332 B2 * | 2/2010 | Quijano | 370/516 |
| 7,684,442 B2 | 3/2010 | Annadurai et al. | |
| 2002/0097737 A1 | 7/2002 | Traverso et al. | |
| 2002/0141515 A1 | 10/2002 | Enam et al. | |
| 2003/0043810 A1 | 3/2003 | Boduch et al. | |
| 2003/0091041 A1 | 5/2003 | Caia | |
| 2004/0105451 A1 | 6/2004 | Boduch et al. | |
| 2008/0095197 A1 | 4/2008 | Boduch et al. | |

FOREIGN PATENT DOCUMENTS

| | | |
|---|---|---|
| WO | WO 2004/012369 | 2/2004 |

OTHER PUBLICATIONS

International Search Report for Int'l Appl. No. PCT/US03/23939, Date Mailed: Feb. 16, 2004.

Communication Pursuant to Article 94(3) EPC for European Application No. 03 772 139.6; Date Mailed: Feb. 19, 2008.

* cited by examiner

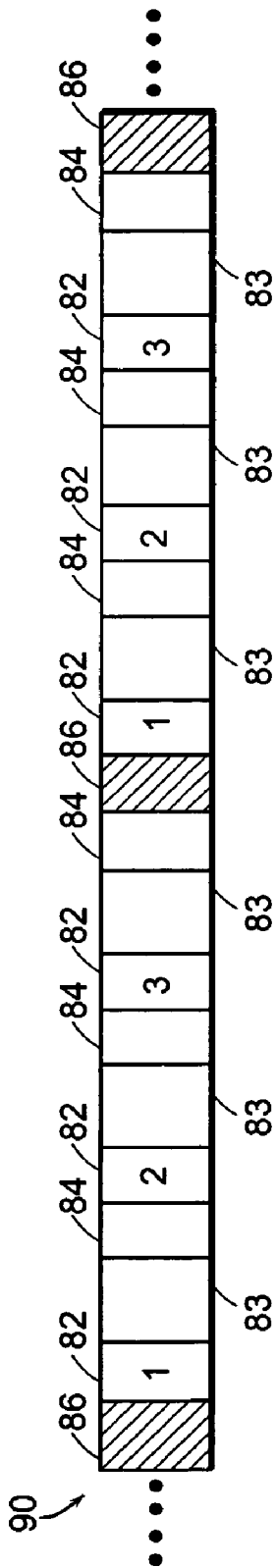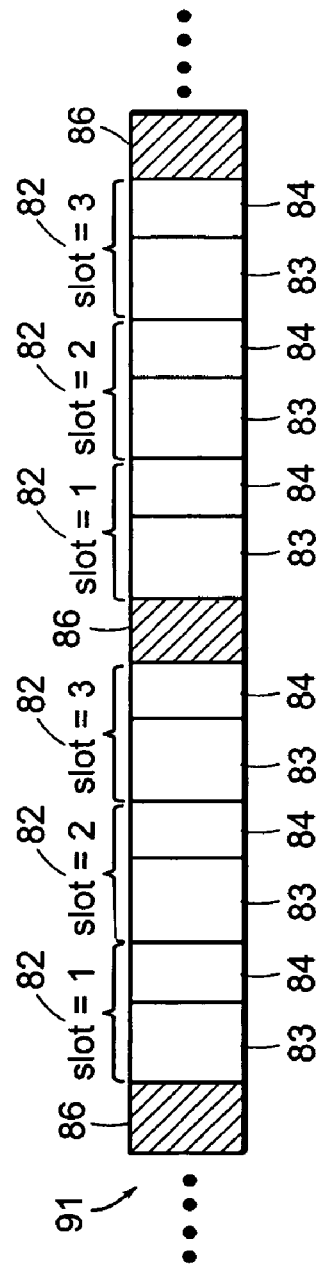
FIG. 9

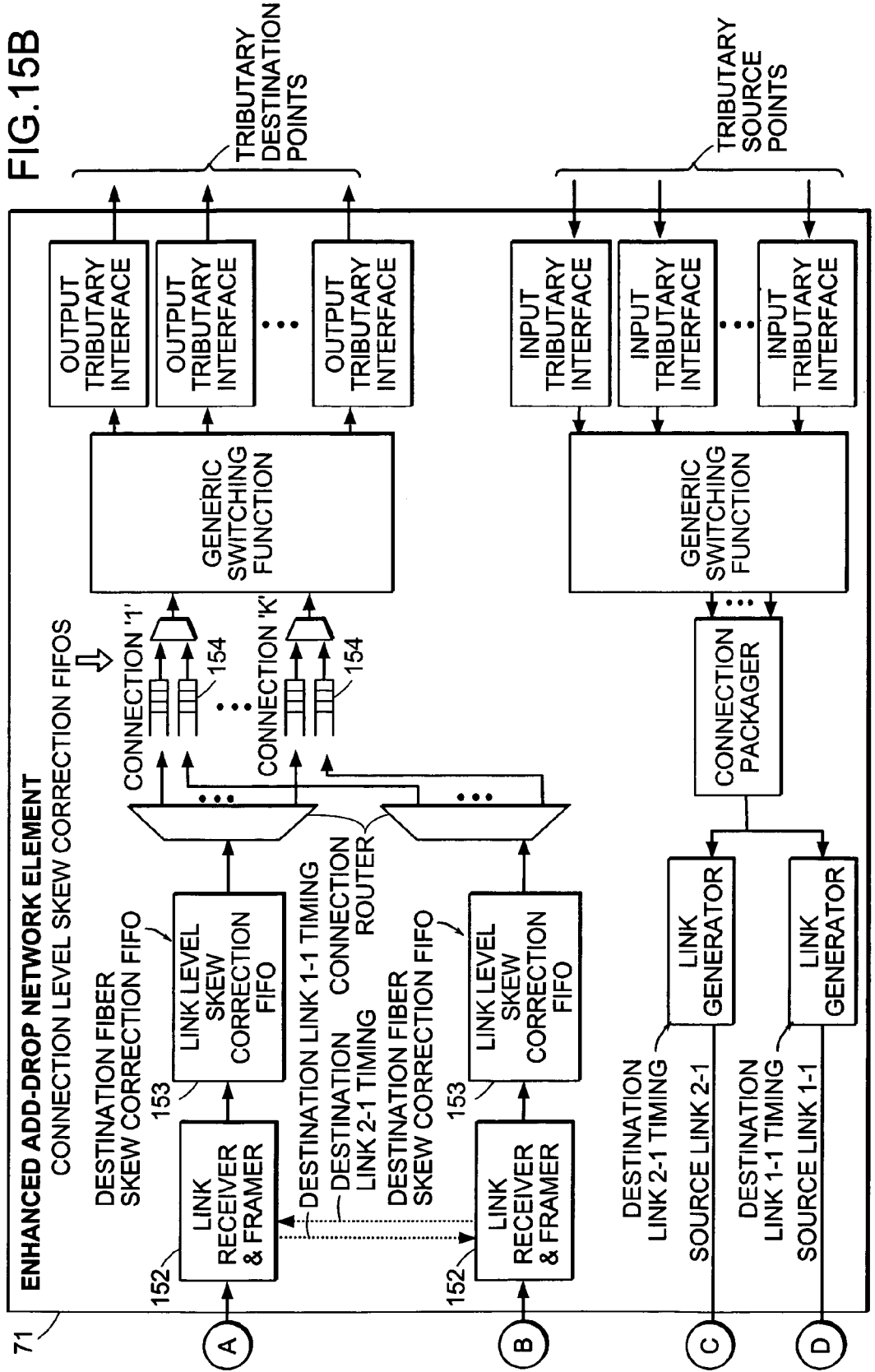

METHODS AND APPARATUS FOR IMPROVED COMMUNICATIONS NETWORKS

RELATED APPLICATION(S)

This application claims the benefit of U.S. Provisional Application No. 60/400,136, filed on Jul. 31, 2002 and U.S. Provisional Application No. 60/400,228, filed on Jul. 31, 2002; the entire teachings of the above applications are incorporated herein by reference.

BACKGROUND OF THE INVENTION

Today's SONET transport networks allow erroneous data to propagate through the network prior to the detection of the faults causing the errors and prior to the completion of the fault recovery action. In typical SONET networks, the erroneous data due to faults may propagate through the network for as long as 60 ms. SONET "facility protection mechanisms" include both line level protection schemes (e.g., Linear APS, BLSR) and path (payload) protection schemes (e.g., UPSR). However, these schemes can allow erroneous data to propagate through the network until the detection and recovery processes have completed.

SUMMARY OF THE INVENTION

The methods and apparatus according to the principles of the present invention can prevent erroneous data due to faults from propagating through the network by using a fault masking technique, and, therefore, can eliminate the 60 ms of error propagation time associated with SONET networks. The fault masking technique can also prevent random bit errors from propagating through the network.

The methods and apparatus may be embodied in a network node that includes network elements adapted to be interconnected in a network configuration. The network configuration is defined as having network boundaries and a network node interior. The interconnected network elements transport substantially error-free information between first and second network boundaries at a given transport rate with substantially continuous data flow with respect to the given transport rate. The substantially continuous data flow continues throughout a transition from a state of no faults to a state of soft or hard faults within the network node interior. The network elements may include multiple add-drop network elements connected to two central switching network elements via communication links. The communication links may be diversely routed (e.g., having a length differential of 20 km or more).

At the network boundaries, the network node may align a frame of data in two steps. The first step includes adjusting at a first granularity the phase of an out-of-phase frame of data to an intermediate phase. The second step includes adjusting at a second granularity the phase of the intermediate frame of data to align the frame of data to the predetermined phase. This technique is scalable for very wide words (e.g., 128 bits) for use with high speed optical communications protocols, such as OC-192.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a datagram of example connection transport links of FIG. 8B;

DETAILED DESCRIPTION OF THE INVENTION

A description of preferred embodiments of the invention follows a brief discussion of a generic add-drop network element and example network configurations in which they may be used. These networks correct errors within the network with traditional error recovery techniques, which, in Synchronous Optical Networks, for example, have a 60 msec requirement for recovery. As will be discussed in reference to a network node, according to the principles of the present invention, having a network configuration, a fault masking technique is employed that makes faults internal to the network node transparent to external network nodes. Line level and connection level alignment processes may be employed to facilitate the fault masking. The network node may include network interfaces, such as add-drop nodes, connected to two central switching network elements via diversely routed high-speed fiber optic communications links. Additionally, frame alignment may be used to reduce logic associated with high-speed information transfers among the network elements.

Figure 1:
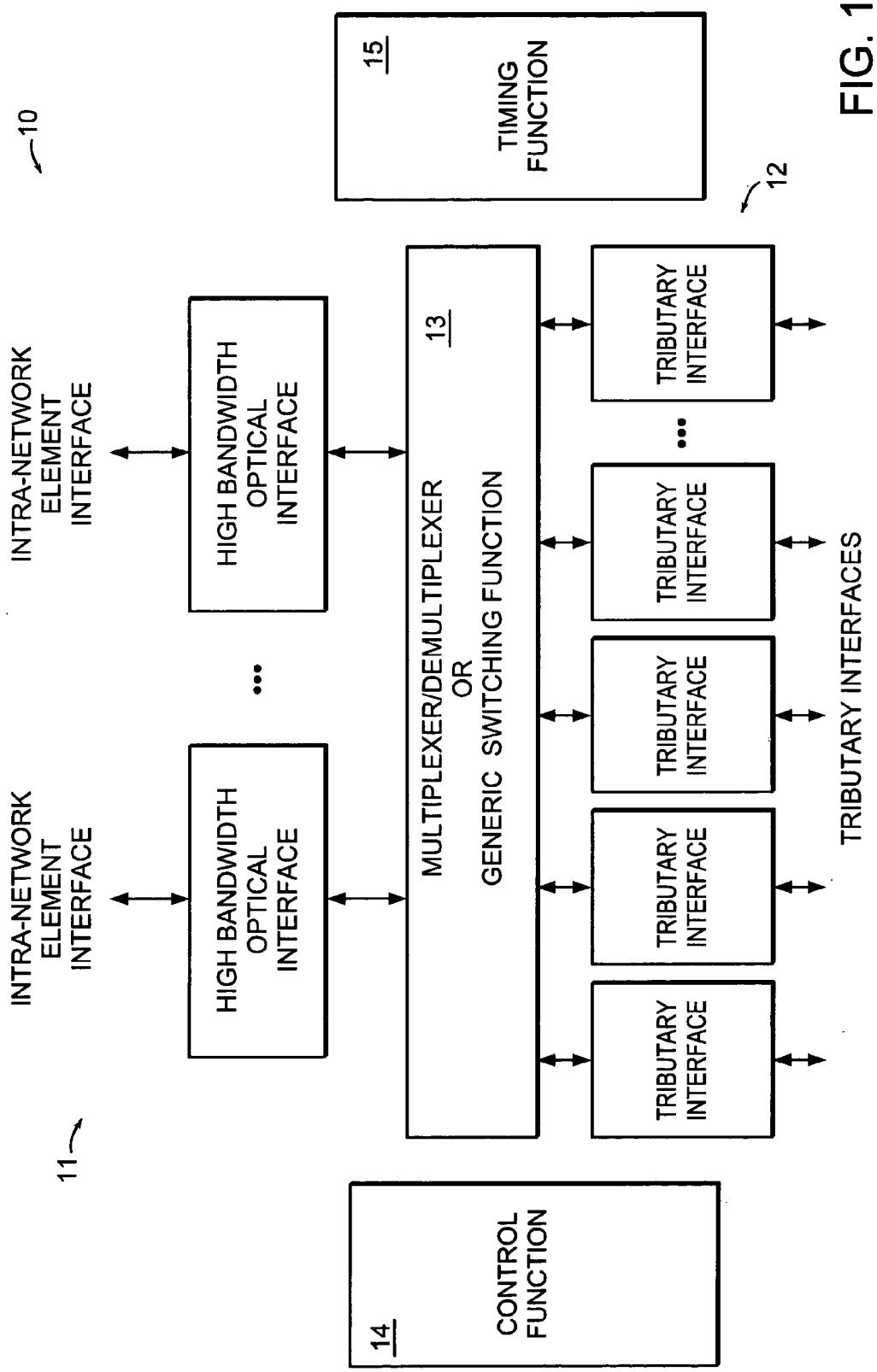
FIG. 1 is a block diagram of an add-drop network element having provisions for interfacing with a Synchronous Optical Network (SONET)

An exemplary generic (i.e., traditional) non-fault masking supportive add-drop Network Element (NE) 10 is depicted in FIG. 1. The add-drop NE 10 contains both intra-network element interfaces 11, which may be high bandwidth optical interfaces used to interconnect NEs, and tributary interfaces 12, used to add or drop traffic to or from a network of NEs). With respect to a transport network (discussed in reference to FIGS. 2 and 3) in which the NE 10 is deployed, a "connection" can originate at the tributary input interface 12 of one add-drop NE 10 (tributary source-point), and terminate at the tributary output interface 12 of another NE 10 (tributary destination-point). Internally, along with a control function processor 14 and a timing function processor 15, the generic add-drop NE 10 contains either a multiplexer/demultiplexer 13 or a generic switching function processor 13. Traditionally, networks have been constructed by interconnecting generic add-drop Network Elements 10 in either a linear topology (example shown in FIG. 2) or a ring topology (example shown FIG. 3).

Figure 2:
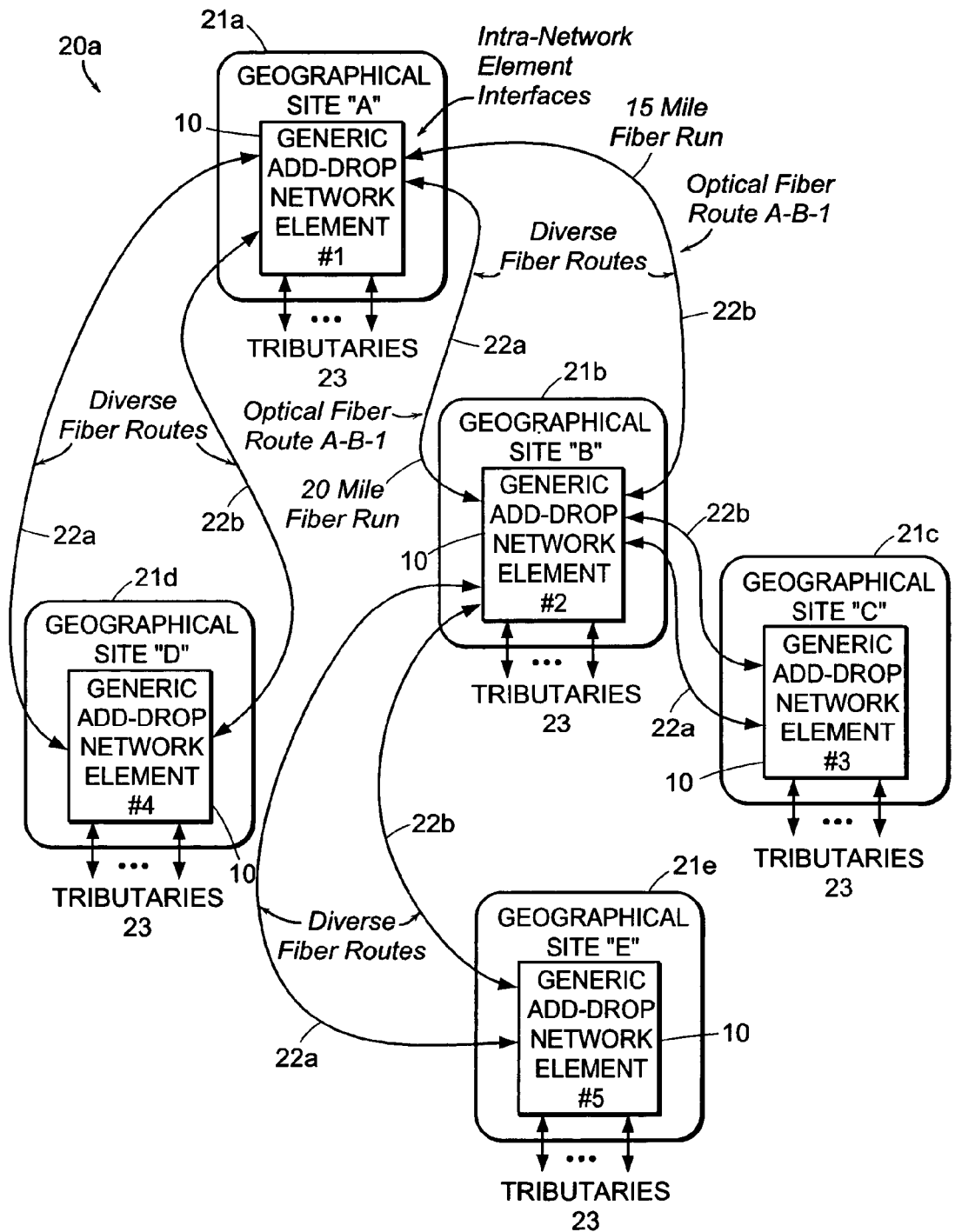
FIG. 2 is an example linear network topology using the add-drop network element of FIG. 1.
Figure 3:
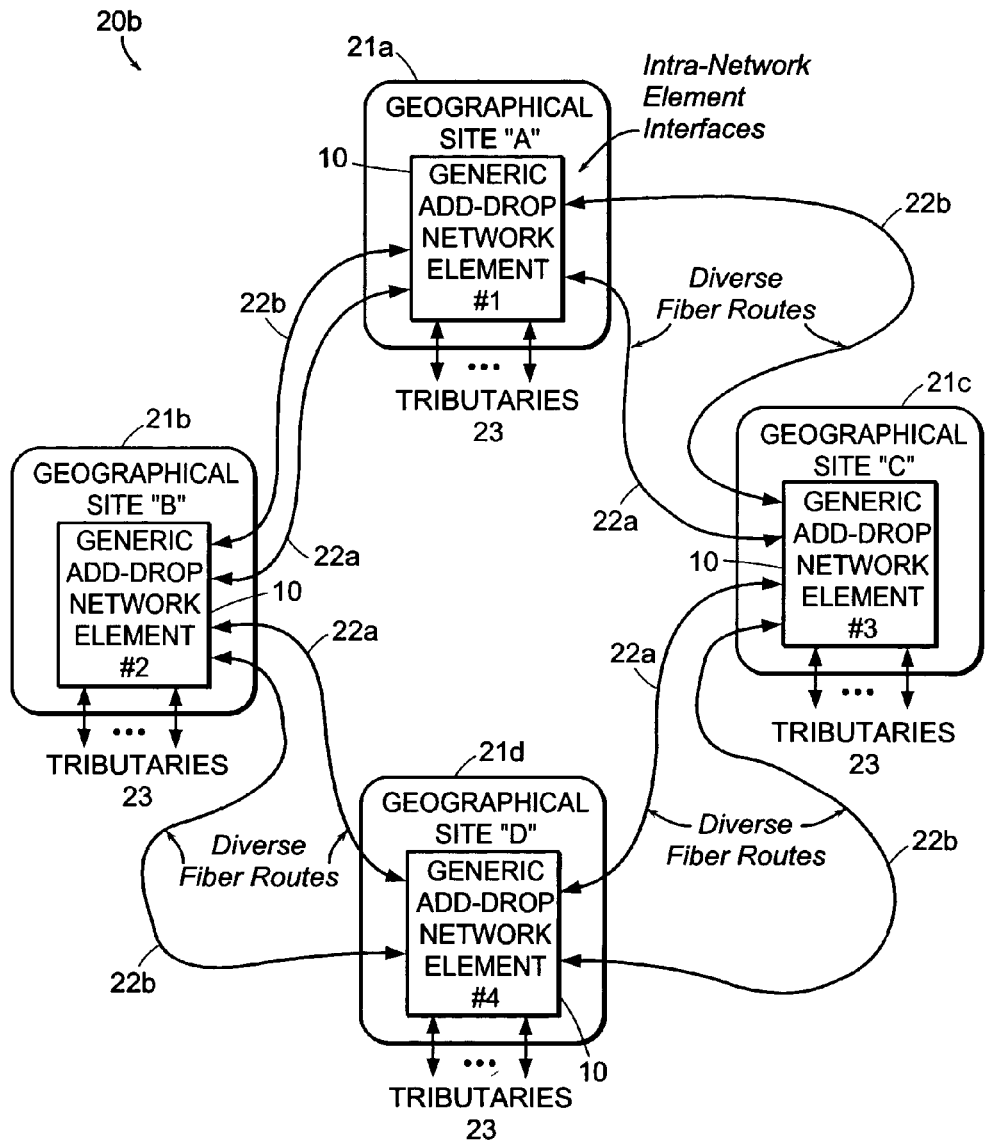
FIG. 3 is a ring network employing the add-drop network element of FIG. 1.

Referring to FIGS. 2 and 3, the reliability of a network 20a, 20b can be increased by interconnecting add-drop NEs 10 with two bi-directional fiber links 22a and 22b (collectively links 22). Typically, one fiber link 22a (the "working" link 22a) is used to transport all the traffic between two add-drop NEs 10, and the second fiber link 22b (the "protection" link 22b) is only used if the "working" link 22a "fails". In order to further increase the reliability of the network 20a, 20b, the two bi-directional fiber links 22 are "diversely" routed between any two nodes (i.e., add-drop NEs 10) at respective geographical sites 21a, 21b, 21c, 21d, and 21e (collectively 21). This means that the two fibers 22 are not "run" side by side between two NEs 10, but are instead routed separately over geographically different routes. One by-product of diverse fiber routing is that the two fiber links 22a and 22b between two nodes typically end up varying in length by a large amount. For instance, in FIG. 2, the add-drop NE 10 at geographical site "A" 21a is connected to add-drop NE 10 at geographical site "B" 21b via one fiber link 22b that is 15 miles in length, and another fiber link 22b that is 20 miles in length. Therefore, if the same data is simultaneously sent on both fibers between these two add-drop NEs 10, the data traveling on the 15-mile fiber link 22b arrives sooner than the data traveling on the 20-mile fiber link 22a.

Figure 4:
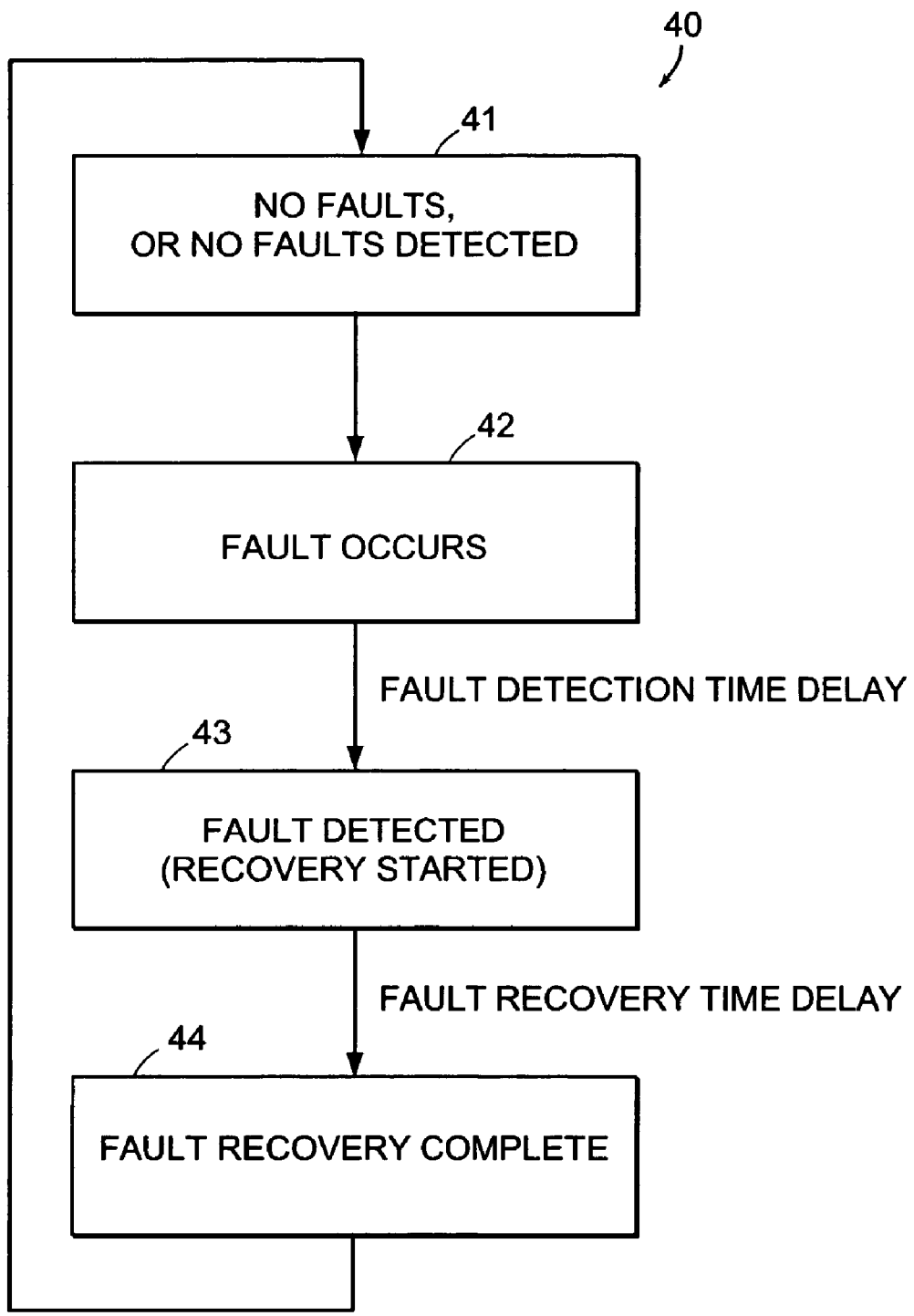
FIG. 4 is a flow diagram of a fault recovery process used by the networks of FIGS. 2 and 3.

FIG. 4 illustrates an exemplary fault process flow 40 of a fault tolerant system. The flow 40 is as follows. Normally, a given system (e.g., add-drop NE 10) operates in a fault free state (step 410). However, once a fault occurs (step 42), there is some delay (Fault Detection Time Delay) before the fault is detected by the system (step 43). A fault may be defined as an erroneous state of hardware or software resulting from failures of components, physical interference from the environment, operator error, software induced error, or incorrect design. Once the fault is detected, fault recovery actions begin (step 43). However, there is some delay (Fault Recovery Time Delay) between when the fault is detected and when the recovery actions are completed (step 44). Once the recovery actions are completed, the system returns to its fault free state (step 41). A technique used to hide the effects of a fault (e.g., Fault Recovery Time Delay) is referred to as "fault masking".

Figure 5:
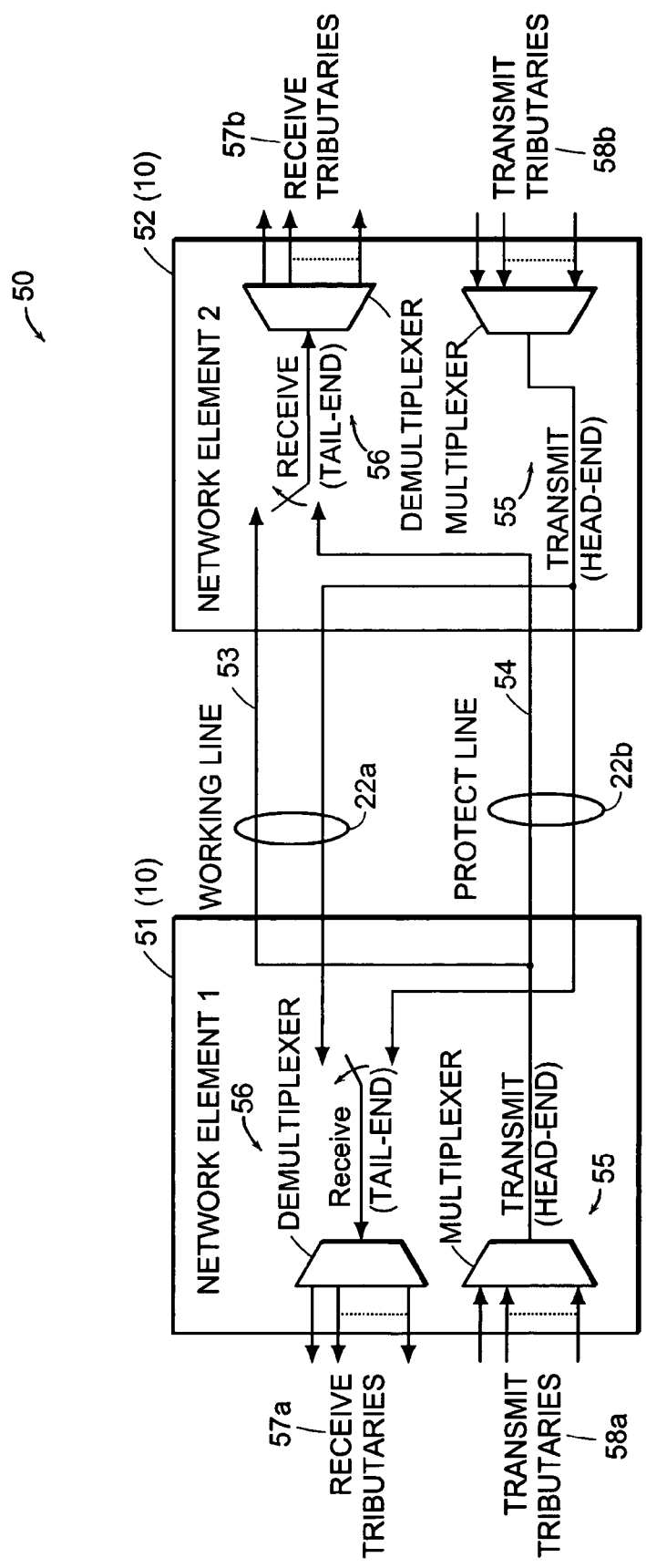
FIG. 5 is a schematic diagram of two add-drop network elements of FIG. 1 interconnected in a manner facilitating execution of the process of FIG. 4.

FIG. 5 illustrates an exemplary SONET 1+1 Linear APS system 50 (as described in *Synchronous Optical Network (SONET) Transport Systems: Common Generic Criteria*, Telcordia Technologies, GR-253-CORE Issue 3, September 2000). The generic add-drop Network Elements 10 have been redrawn with logical units (i.e., multiplexers 55 and demultiplexers 56) represented based on the components discussed in FIG. 1. In the 1+1 Linear APS system 50, a head-end signal is continuously bridged to both the working and protection equipment 55, 56 (connected to the working line (22a) and protection line (22b)) so that the same payloads are transmitted identically to the tail-end working and protection equipment 56 (i.e., receiving equipment 56). At the tail end, the working and protection signals are monitored for failures. The receiving equipment 56 then chooses either the working or the protection signal received from the head-end equipment 55 (i.e., transmitting equipment 55) as the one from which to select the traffic.

According to GR-253-Core Issue 3, the allowed "Fault Detection Time Delay" for SONET equipment operating with 1+1 Linear APS protection is 10 ms, and the allowed "Fault Recovery Time Delay" is 50 ms. Therefore, with 1+1 Linear APS, erroneous data can end up propagating through the network for up to 60 ms.

Continuing to refer to FIG. 5, there may be an event that Network Element #2 (52) is selecting its traffic from the working line 53, and then the working line is cut (not shown) such that no traffic arrives at Network Element 2 from Network Element #1 (51). Until Network Element #2 switches to the protection line 54 for its traffic, Network Element #2 will be unable to forward any traffic to its Receive Tributaries 57b from Network Element #1 (51). For this case, traffic will be interrupted for up to 60 ms.

Random bit errors are often referred to as "soft" faults. For the SONET 1+1 Linear APS system 50, a switch from the working line 22a to the protection line 22b is not initiated until some Bit Error Rate (BER) threshold is exceeded. Therefore, if the BER of the working line 22a is less than the established threshold, bit errors may continuously be forwarded to the Receive Tributaries 57b of Network Element #2.

Normally, the working and protection line interfaces are located on physically separate modules within the add-drop network elements 10. There are cases where it may be desired to perform a "tail-end switch" even though there are no faults associated with either the working or protection lines 22a, 22b, respectively. For instance, there may be cases where there is a desire to "upgrade" the modules associated with the physical line interfaces. However, since the working and protection lines 53, 54 are typically diversely routed, the delays associated with the two paths can be substantially different. Therefore, the traffic carried on the protection line 22b will normally be out-of-phase with respect to the "same" traffic on the working line 22a. This situation is illustrated in FIG. 6.

Figure 6:
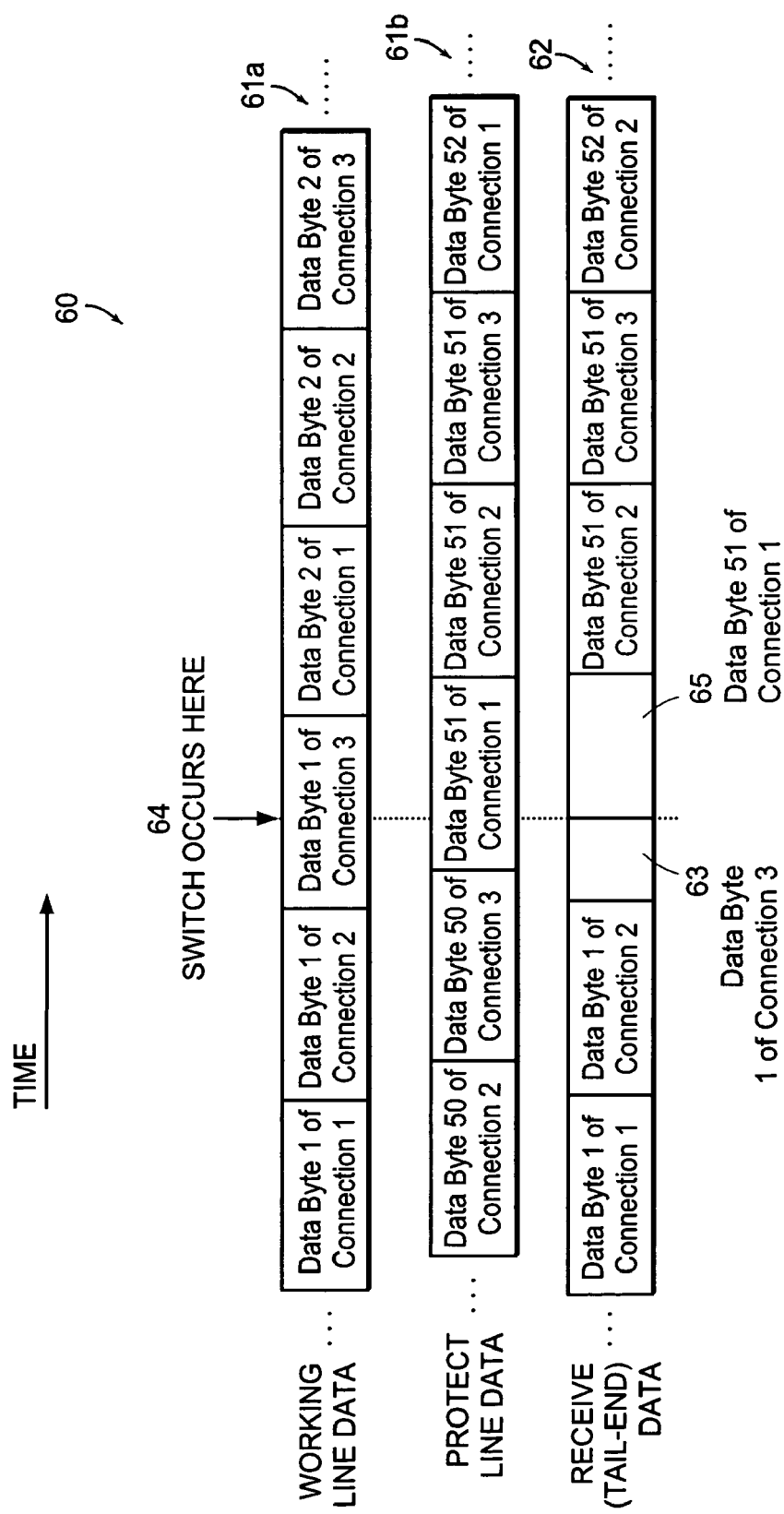
FIG. 6 is a timing diagram of data transport interrupted during the process of FIG. 4.

FIG. 6 illustrates the case where a line switch 64 from the working line 22a to the protection line 22b is performed. Working line data 61a and protection line data 61b are received at a network element 10, and the working line data 61a is initially selected for receive (tail-end) data 62. Since the traffic associated with the protection line 22b is not in phase with the traffic 61a associated with working line 22a, following the switch 64, the data 62 associated with every connection is disrupted. In the example of FIG. 6, following loss of the working line data 61a for any number of reasons, the protection switch 64 occurs, and approximately 50 bytes of data 63, 65 is dropped from each connection in traditional protection switch schemes for SONET networks.

There is an interest in network management to reduce loss of the 50 bytes of data and 60 msec of switch time. Using methods and apparatus according to the principles of the present invention, a network node is able to mask both hard and soft faults that occur in a typical network of network elements as just described that lead to such losses. The network node may be a distributed system that can be described as a network or subnetwork (e.g., two central switch fabrics and multiple network interface modules, such as add-drop network elements, located proximal to or distal from the central switch fabrics). Furthermore, the network node allows error-free switches between the working and protection lines that interconnect two network elements.

Figure 7:
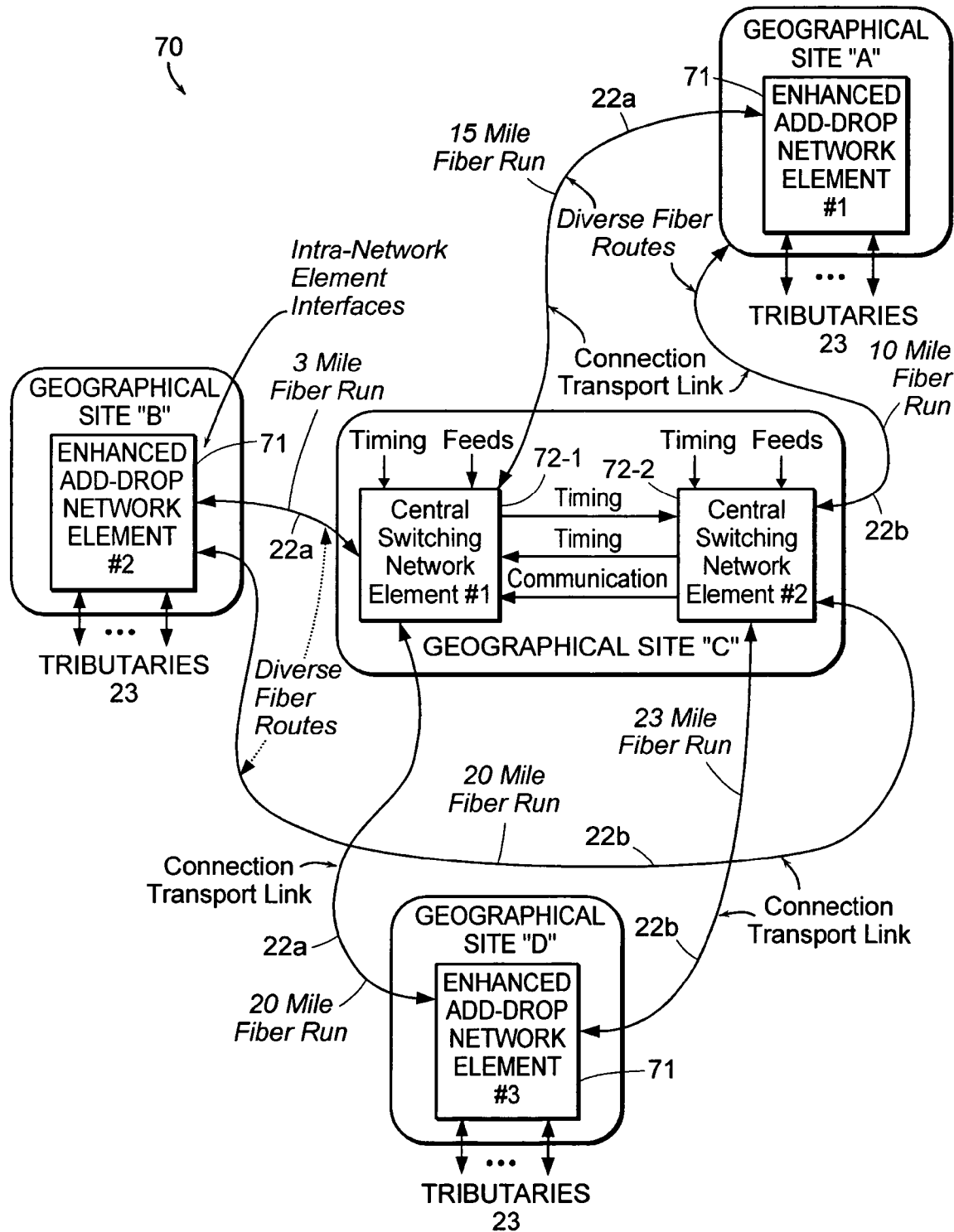
FIG. 7 is a block diagram of a network node employing the principles of the present invention.

FIG. 7 illustrates an exemplary embodiment of a network node 70 according to the principles of the present invention. As can be seen, the generic add-drop network elements 10 of FIG. 2 and FIG. 3 are replaced with "enhanced" add-drop network elements 71, and the enhanced add-drop network elements 71 are interconnected via two "central switching" network elements 72. As in the networks of FIGS. 2 and 3, the working and protection fibers 22a, 22b associated with each enhanced add-drop network element 71 can be diversely routed.

Whereas, in the linear network 20a (FIG. 2) and ring network 20b (FIG. 3) the network elements 10 are distinct operational entities, the network node 70 of FIG. 7 is labeled as such (i.e. "network node") because the network elements 71 operate in conjunction with the central switching network elements 72 to form a "virtual" network node, referred to as such since faults are masked from external network nodes. In other words, the exemplary embodiments described herein use a technique called "fault masking" in order to "hide" network level faults. With this technique, when faults occur internal to the network node 70, the internal faults are essentially hidden from the tributary destination-points 23 such that the tributary destination-points 23 are unaware that the internal faults ever occurred.

The network node may be configured as a distributed system with connection transport links (e.g., optical fibers) that are deployed with diverse routes between geographical sites. The geographical sites may be arranged such that network interface ports or modules are located a relatively long distance (e.g., 20 km-40 km) away from central switching network elements. Two optical fibers, optionally used for communications links, may be routed diversely between the geographical sites to ensure that a single fault, such as a line cut due to a backhoe, does not interrupt communications in both links. If there is a disruption in one of the links, the network node masks the error from external network nodes.

The network node includes multiple network elements that are adapted to be interconnected in a network configuration. The network configuration may be defined as having first and second network boundaries and a network node interior. The network elements at the network boundaries may be add-drop network nodes. In the network node interior may be central switching network elements through which signals communicated between add-drop network elements are switched. In one embodiment, each of the add-drop network elements is connected to the two (or more) central switching network elements via respective diversely routed fiber optic cables. The fiber optic cables may be used to carry information through use of high-speed optical communications protocols, such as OC-192, which transmits optical signals at approximately 10 Gbps.

The interconnected network elements in the network node transport substantially error-free information between the first and second network boundaries (e.g., add-drop network elements) at a given transport rate where substantially continuous data flow with respect to the given transport rate continues throughout a transition from a state of no faults to a state of soft or hard faults within the network node interior. The data flow may be real-time data flow or non-real-time data flow. The substantially continuous data flow means that recovery due to soft or hard faults within the network node interior are recovered much faster (i.e., orders of magnitude less) than the 60 ms required by synchronous optical network (SONET) specifications. The substantially error-free information means that information between the network elements at the network boundaries is transmitted without error, which is a result of providing redundancy in the connection transport links between the network elements at the network boundaries and the central switching network elements.

In one embodiment, the network elements include a plurality of add-drop network elements connected to two central switching network elements via communications links. A given add-drop network element may include both a source network endpoint, where information is added to the network node using tributary inputs, and a destination network endpoint, where information is dropped from the network node using tributary outputs. The two central switching network elements may reside in the same geographic location or different geographic locations.

The add-drop network elements may insert information entering the network node at a given source network endpoint into connection transport units. The add-drop network elements may also segregate the information into connection transport units as a function of the destination of the information within the network node and the quality of service metric associated with the information.

Each add-drop network element may forward an identical copy of each connection transport unit to each central switching network element. Each central switching network element may responsively switch each connection transport unit to one or more output interfaces on the central switching network element such that, in a fault free network, a given destination network endpoint receives two copies of a connection transport unit destined for its destination network endpoint. If one copy of a given connection transport unit does not arrive at the destination network endpoint from a given central switching network element, the connection transport unit may be selected from the other central switching network element.

A given destination network endpoint may select the better of the two identical copies of the connection transport units on a connection transport unit-by connection transport unit basis and forward the information within the selected connection transport unit to a tributary output of the destination network endpoint. Prior to the selection process, the destination network endpoint of an add-drop network element may align identical connection transport units from each switched network element with one another.

At least one processor at the central switching network elements and at least one processor at a given destination network endpoint may align the connection transport units using a three-step process. One step is executed by a processor at the central switching network elements, in which the processor aligns line level information from multiple source network endpoints at the inputs of each central switching network element. Another step is executed by at least one processor at the given destination network endpoint, where the processor aligns line level information from two central switching network elements with each other. A third step is executed by a processor at the given destination network endpoint, where the processor aligns identical connection transport units.

A given destination network endpoint may select between the two identical connection transport units arriving at the given destination network endpoint as a function of the integrity of the information within the two identical connection transport units by using an integrity indicator associated with each connection transport unit or an integrity indicator associated with a group of connection transport units. The connection transport units may be time division multiplexed (TDM) time slots on the communications links between the network elements. The connection transport units may be fixed length packets or cells on the communications links between the network elements or may be variable length packets on the communications links between the network elements.

At the network elements in the network node, aligning a frame of data may be performed to align the frame of data to a predetermined phase. A process used to correct the phase adjusts the phase of an out-of-phase frame of data at a first granularity to an intermediate phase. A second step of the aligning process includes adjusting the phase of the intermediate frame of data at a second granularity to align the frame of data to the predetermined phase. Adjusting the phase at the first granularity may be based on a predetermined pattern of data (e.g., F6H) in the frame of data and adjusting the phase at the second granularity may be based on a second predetermined pattern of data in the frame of data (e.g., F6F6F6282828H), where the first pattern of data is related to the second pattern of data.

Adjusting at the first granularity may include shifting the data in the frame of data less than the length of a predetermined pattern in the frame of data. Adjusting at the second granularity may include shifting the data and the frame of data in increments equal to the length of the predetermined pattern. The first granularity may be finer than the second granularity.

This alignment process may be used to align frames with interleaved data such as OC-3 formatted data.

The process may also include determining a position location of the first predetermined pattern in the frame of data and determine a transition located from the first predetermined pattern to a second predetermined pattern. These predetermined patterns may be related to the phase of the frame of data.

This network node and frame alignment process may be used in a Synchronous Optical Network (SONET) network or a Synchronous Digital Hierarchy (SDH) network.

Figure 8:
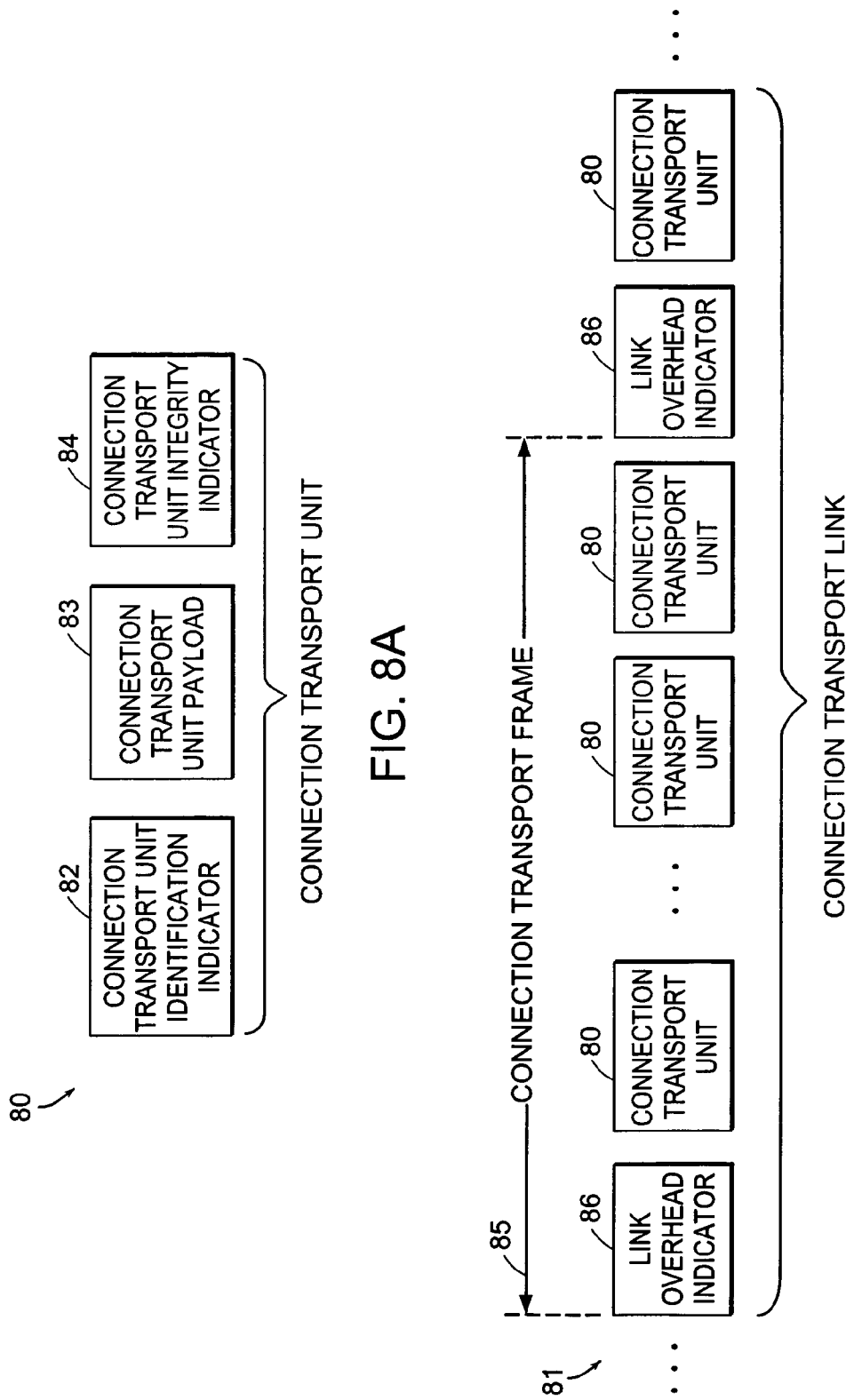
FIG. 8 includes FIG. 8A which includes a block diagram of a connection transport unit, and FIG. 8B which includes a connection transport link transmitted between network elements in the networks arrangements of FIGS. 2, 3, and 7.

In order to gain an understanding of how network fault masking works in the network node 700 of FIG. 7, some fundamental concepts and associated terminology are now introduced briefly in reference to FIG. 8. In FIG. 8, which includes FIGS. 8A and 8B, the concepts of a "connection transport unit" 80 and a "connection transport link" 81 are introduced. As shown in FIG. 8A, the exemplary embodiment connection transport unit 80 includes a connection transport unit payload 83, a connection transport unit 80 integrity indicator 84, and the connection transport unit identification indicator 82. Each connection transport unit 80 is used to transport a portion of the information associated with one network level connection. Typically, network traffic with the same network source point, the same network destination point, and the same quality of service requirements may share the same network level connection. The connection transport unit payload 83 contains the actual information (i.e., the payload) associated with the connection, while both the connection transport unit identification indicator 82 and the connection transport unit integrity indicator 84 are overhead. This overhead is added to the information portion of the connection as the information is inserted into the network node 70 and is removed from the connection as the information leaves the network node 70. With respect to the enhanced add-drop network elements 71 depicted in FIG. 7, information associated with connections enter and leave the network node 70 at the tributary interfaces (not shown in detail) of the enhanced add-drop network elements 71 that interface to the tributaries 23.

FIG. 8B also depicts an exemplary embodiment connection transport link 81. The connection transport link 81 is used to transport connection transport units 80 between enhanced network elements 71. Associated with the connection transport link 81 is a connection transport frame 85. The boundaries of the connection transport frame 85 are marked by link overhead indicators 86. Some number of the connection transport units 80 are transported over the link 81 between each link overhead indicator 86. The link overhead indicator 86 contains some predefined sequence of characters (referred to as a framing pattern) that are used to locate the link overhead indicators 86. The link overhead indictors 86 may contain additional information concerning the connection transport link 81, such as link identification information and link integrity indicators.

Exemplary embodiments of the fault masking switching network node 70 may be constructed using different types of connection transport units 80. Types of connection transport units 80 include Time Division Multiplexed (TDM) connection transport units, fixed length packet connection transport units (i.e., cells), and variable length packet connection transport units. A given fault masking switching network node 70 may use only a single type of connection transport unit 80, or it may use more than one type of connection transport unit 80. An exemplary embodiment uses fixed length packet connection transport units (or cells).

With respect to the exemplary embodiment connection transport unit 80, the connection transport unit identification indicator 82 is used to distinguish one connection from another. It does this by assigning a different number to the identification indicator 82 associated with different connections. The identification indicator 82 may require additional link bandwidth (for the case of fixed or variable length packet type connection transport units), or it may simply be implied by the connection transport unit's physical location within the transport link 81 with respect to the link overhead 86 (for the case of TDM type connection units).

FIG. 9 helps illustrate this concept by comparing an exemplary fixed length packet connection transport link 90 to an exemplary time division multiplexed (TDM) connection transport link 91. Both of the illustrated transport links contain three connection transport units 80 per frame period 85. Furthermore, the size of the link overhead indicators 86 are the same in both links 90, 91, the size of the payloads 83 are the same in both links 90, 91, and the size of the integrity indicators 84 are the same in both links 90, 91. However, for the case of the TDM connection transport link 91, there is no bandwidth required for the identification indicator 82, since a connection is identified by the TDM slot it occupies within the frame structure.

The exemplary embodiment connection transport unit integrity indicator 84 is used to determine whether the associated connection transport unit payload 83 contains errors. For instance, the integrity indicator 84 may contain a Cyclic Redundancy Code (CRC) which is calculated over the bits of the associated connection transport unit payload 83. Simpler integrity indicators (such as Bit Interleaved Parity (BIP) as described in GR-253-CORE, Issue 3 (full citation above)) can also be used.

The following equation can be used to calculate the link bandwidth:

$$B = \frac{W + n(x + y + z)}{P},$$

Where:
  Link overhead indicator (86)=w bits,
  Connection transport unit identification indicator (82) =x bits,
  Connection transport payload (83)=y bits,
  Connection transport unit integrity indicator (84)=z bits,
  Number of connection units per frame=n,
  Frame period (in seconds)=P,
  Link bandwidth (in bits per second)=B.

As previously mentioned, an exemplary embodiment uses fixed length packet connection transport units (or cells). However, it is assumed (for the purposes of discussion) that each connection is a "TDM type" connection. With respect to a SONET network, a TDM type connection is one that connects one TDM type of tributary signal (at the input of the network node 70) to the same type of tributary signal (at the output of the network node 70). Examples of TDM type of tributary signals are: STS-1 SPEs, STS-3c SPEs, STS-12c SPEs, STS-48c SPEs, VT1.5 SPEs, etc.

Figure 10:
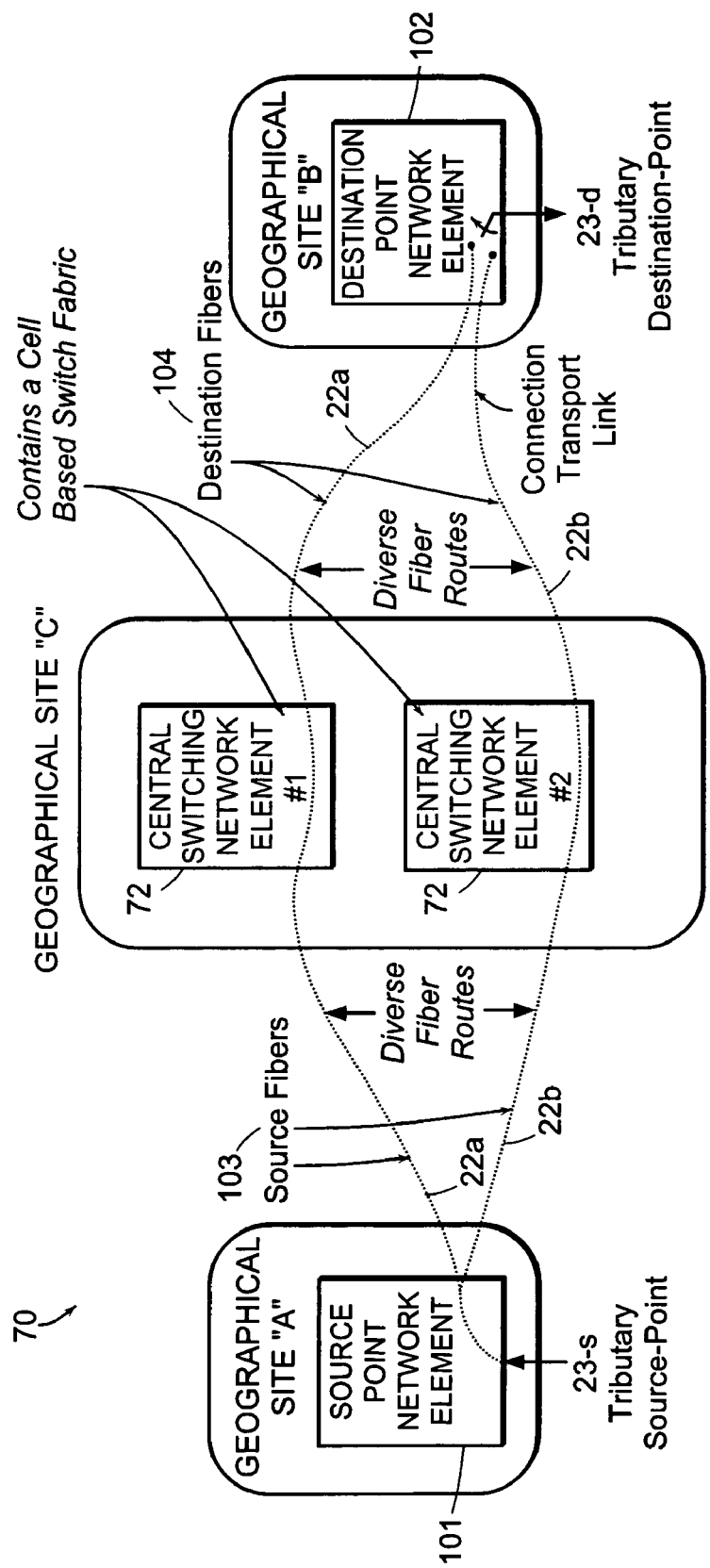
FIG. 10 is a portion of the network node of FIG. 7.

FIG. 10 shows an exemplary path of a connection through a portion of the fault masking network node 70. As shown in FIG. 10, a connection starts at the tributary source-point 23-$s$ at the Source Point Network Element 101, and terminates at the tributary destination-point 23-$d$ at the destination point Network Element 102. The source and destination point network elements 101, 102 are the enhanced add-drop network elements 71 discussed in reference to FIG. 7 but renamed here for clarity of discussion.

After a connection is established between a given tributary source-point 23-$s$ and one or more tributary destination-points 23-$d$, the information (i.e., payload) associated with the connection is packaged into "cell" transport units 80, and the cells 80 are forwarded to the tributary destination-points 23-$d$ via the fault masking network node 70. This is accomplished by sending a duplicate copy of each cell 80 to central switching network element #1 (72-1) and central switching network element #2 (72-2). When the same cell 80 of the same connection arrives at the destination-point network element 23-$d$, the destination-point network element 23-$d$ chooses the "better" of the two cells 80, removes the payload information from the cell, and forwards the payload information of the cell 80 to the appropriate tributary interface (s). The method used to choose the better cell may be a method described in pending U.S. application Ser. No. 09/501,930, filed Feb. 10, 2000, entitled "Methods and Apparatus for Selecting the Better Cell from Redundant Streams within a Cell-Oriented Environment."

An example of this method is as follows: assume that there is a connection from source point network element i to destination point Network Element j. This connection will be referred to as connection C ij. At Source Point Network Element i, each cell of connection C ij is sent to both central switching network element #1 and central switching network element #2. When the two copies of a given cell of connection C ij arrive at destination point Network Element j, "the better cell" selection is accomplished by first aligning the two identical cells of connection C ij. At the destination point Network Element, there is typically some amount of skew between the arrival times of two identical cells of a given connection. Possible sources of skew in the network include: skew due to the diverse routing of the source fibers 103, skew due to the central switching network elements 72, and skew due to the diverse routing of the destination fibers 104.

Under non-fault conditions, also referred to as a "state of no faults", the delay of a given cell of a given connection through central switching element #1 is equal to the delay of the identical cell through central switching element #2. However, if there are faults with the equipment or fiber paths associated with one central switching element and not the other central switching element, then, for the two identical cells of a given connection, the delay through one central switching network element may be different from the delay through the other central switching network element. This situation is illustrated in FIG. 11.

Figure 11A:
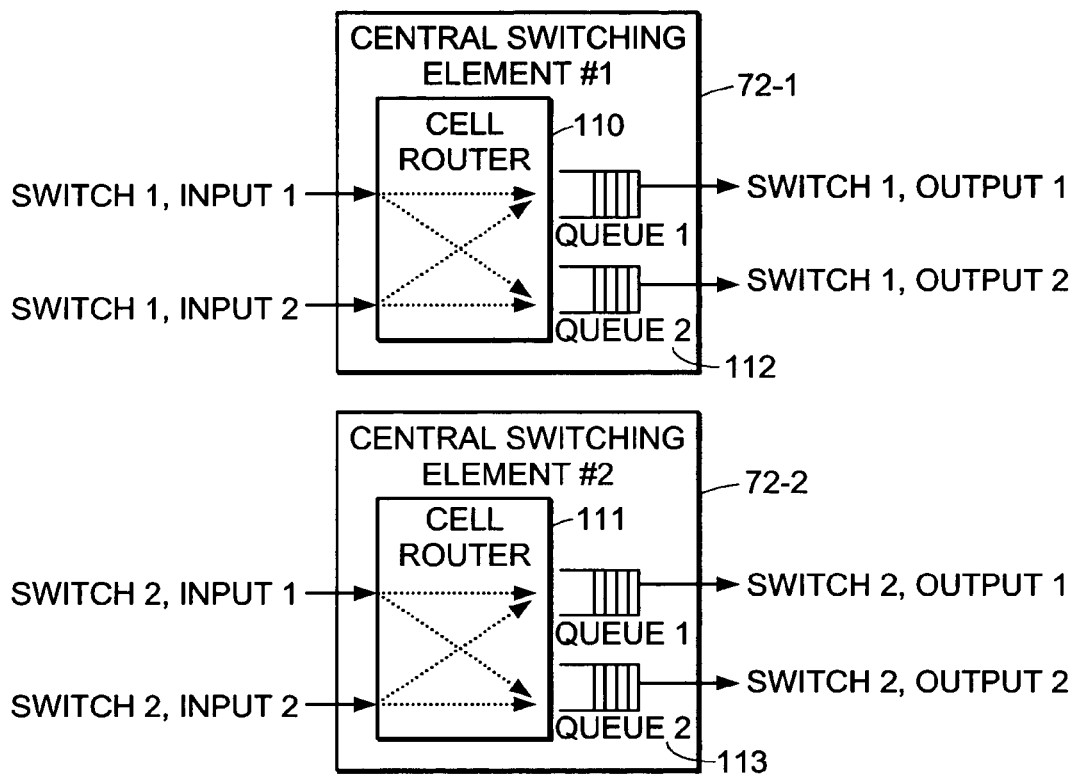
FIG. 11 is a generalized schematic diagram of central switching elements of FIG. 7 and cells that are switched by them.
Figure 11:
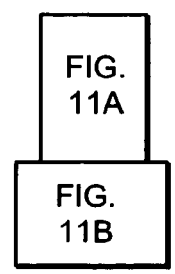
Figure 11B:
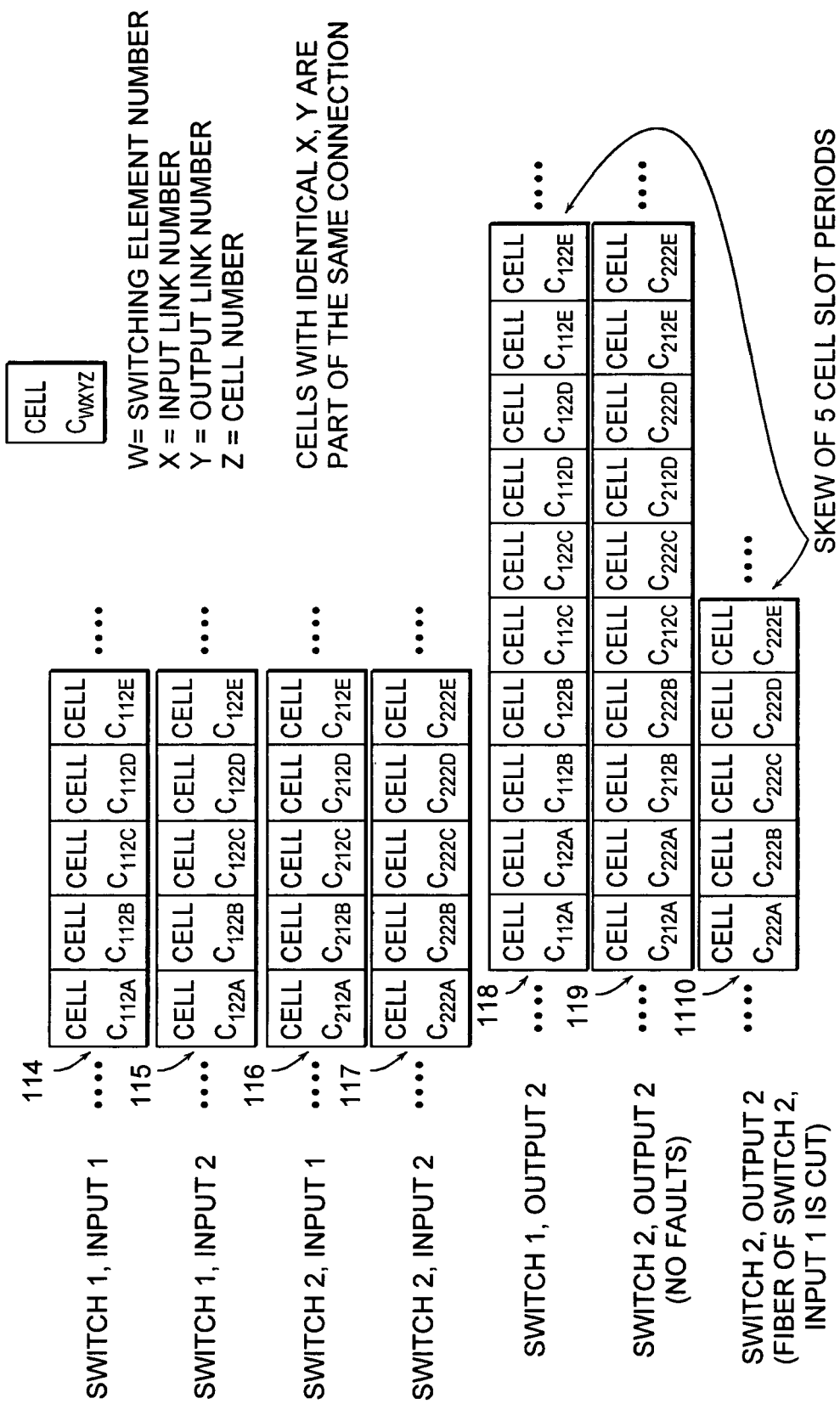

FIG. 11 shows the two simple exemplary central switching elements 72-1, 722 that are timing locked to one another. Each switching element contains two inputs and two outputs. Each switching element contains two First-In-First-Out (FIFO) queues (one for each output) 112, 113, respectively, and a cell router.

During each cell slot period, the cell routers 110, 111 first forward the cell on input 1 to the appropriate queue, and then forwards the cell on input 2 to the appropriate queue. When there are no system faults, the cell stream of switch 2, output 2 119 is identical to the cell stream of switch 1, output 2 (118). This assumes that the input cell streams (114, 115, 116, 117) of the two switch elements are aligned as shown in FIG. 11. However, if, for instance, the fiber connected to input 1 of switch 2 is cut, then the cells of switch 2, output 2 (1110) are no longer aligned to the cells of switch 1, output 2 (118). For example, assuming that the destination fiber 104 associated with switch 2, output 2 is equal in length to the destination fiber associated with switch 1, output 2, CELL C 222E arrives at the destination point network element five cell slot periods earlier than the identical CELL C 122E.

If two connection transport link fibers from a given source point network element are diversely routed such that the fiber run to one central switching network element is longer than the fiber run to the other central switching network element, then when the cells arrive at the central switching network elements, all the cells of one fiber run are skewed with respect to the identical cells of the other fiber run. Such a scenario was illustrated in FIG. 6. Similarly, if two fibers to a given destination point network element are diversely routed such that the fiber run from one central switching network element is longer than the fiber run from the other central switching network element, then cells from one central switching network element arrive later than the cells from the other central switching network element.

In an exemplary embodiment of FIG. 7, for example, in order for the fault masking network node 70 to operate properly, all network elements are substantially "timing locked" together in both frequency and phase. This is accomplished by designating one of the two central switching network elements 72 as the network master timing element. The network master timing element typically obtains its frequency timing from an external timing source (e.g., a BITS clock).

Using the external timing source as a frequency reference, the central switching network element 72 that is serving as the network master timing element generates a low frequency clock that may be used to generate a "link alignment indicator". The link alignment indicator is used throughout the network to "phase align" the connection transport links within the network. In an exemplary embodiment, a 250 Hz low frequency clock is used to generate the link alignment indicator. However, different clock frequencies can be used to generate the link alignment indicator without departing from the spirit of the inventions described herein.

In an exemplary embodiment, a standard SONET fiber link can be used as a connection transport link. The link alignment indicator can be added to a standard SONET Link by inserting it into one of the unused Transport Overhead (TOH) bytes. In an exemplary embodiment, an OC-192 signal is used as the connection transport link; however, signals of other rates, SONET or otherwise, could be used as the connection transport link without departing from the spirit of the inventions described herein.

Figure 12:
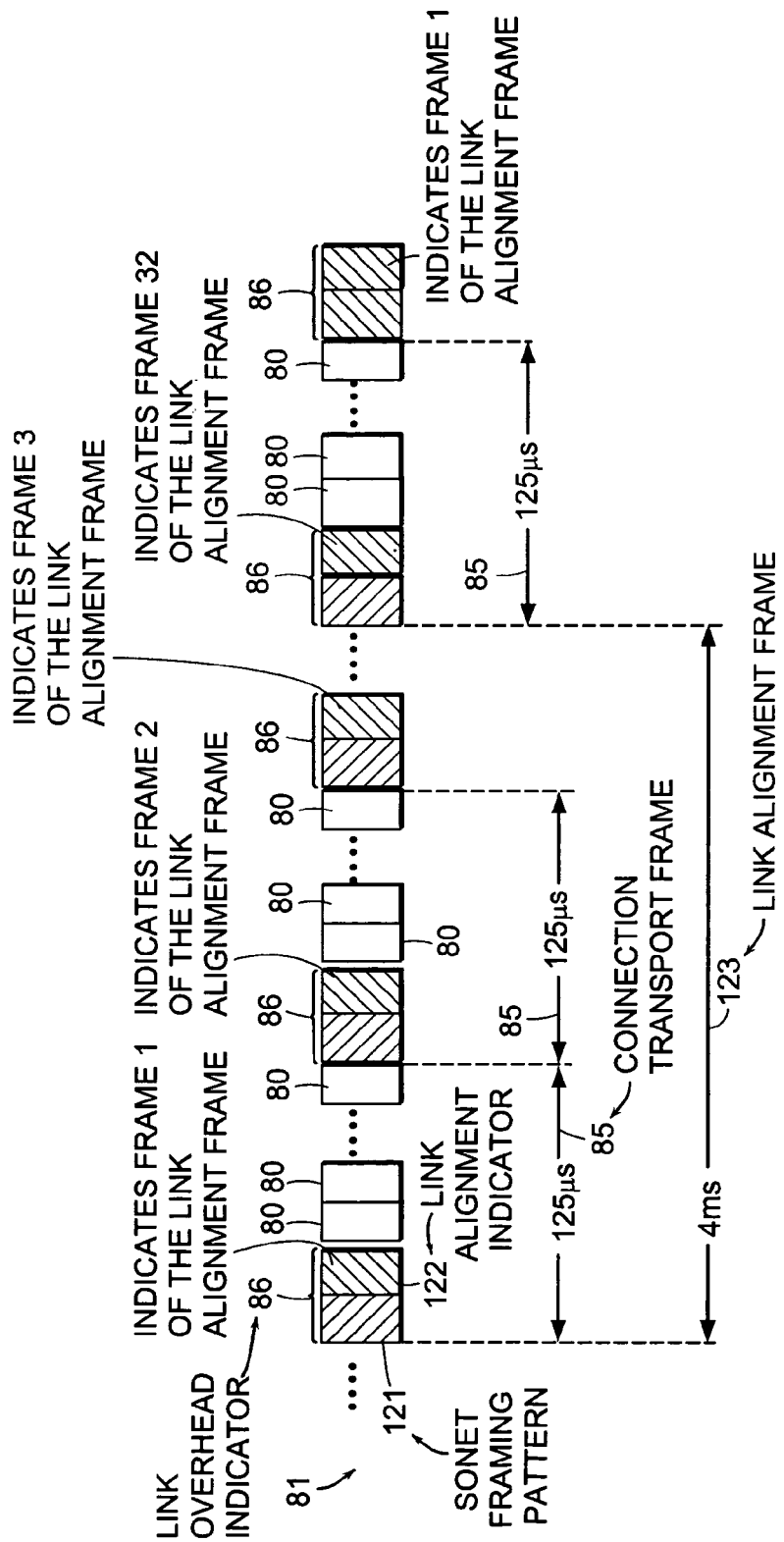
FIG. 12 is a datagram of a link alignment frame that includes the connection transport link of FIG. 8B.

FIG. 12 shows the format of an OC-192 signal serving as an exemplary embodiment connection transport link 81 (FIG. 8B). For this case, the link overhead indicator 86 includes the standard SONET framing pattern 121, as well as one other TOH byte (serving as the link alignment indicator 122). Associated with a given connection transport link 81 is both a link source point 101 (FIG. 10) and a link destination point 102 (FIG. 10). The connection transport link 81 is generated at the link source point, and the connection transport link 81 is received at the link destination point. At a link destination point, circuitry (not shown) is first used to locate the SONET framing pattern 121 (which occurs every 125 μs), and then circuitry (also not shown) is used to locate the link alignment indicator 122, which occurs every 4 ms in an exemplary embodiment).

Figure 13:
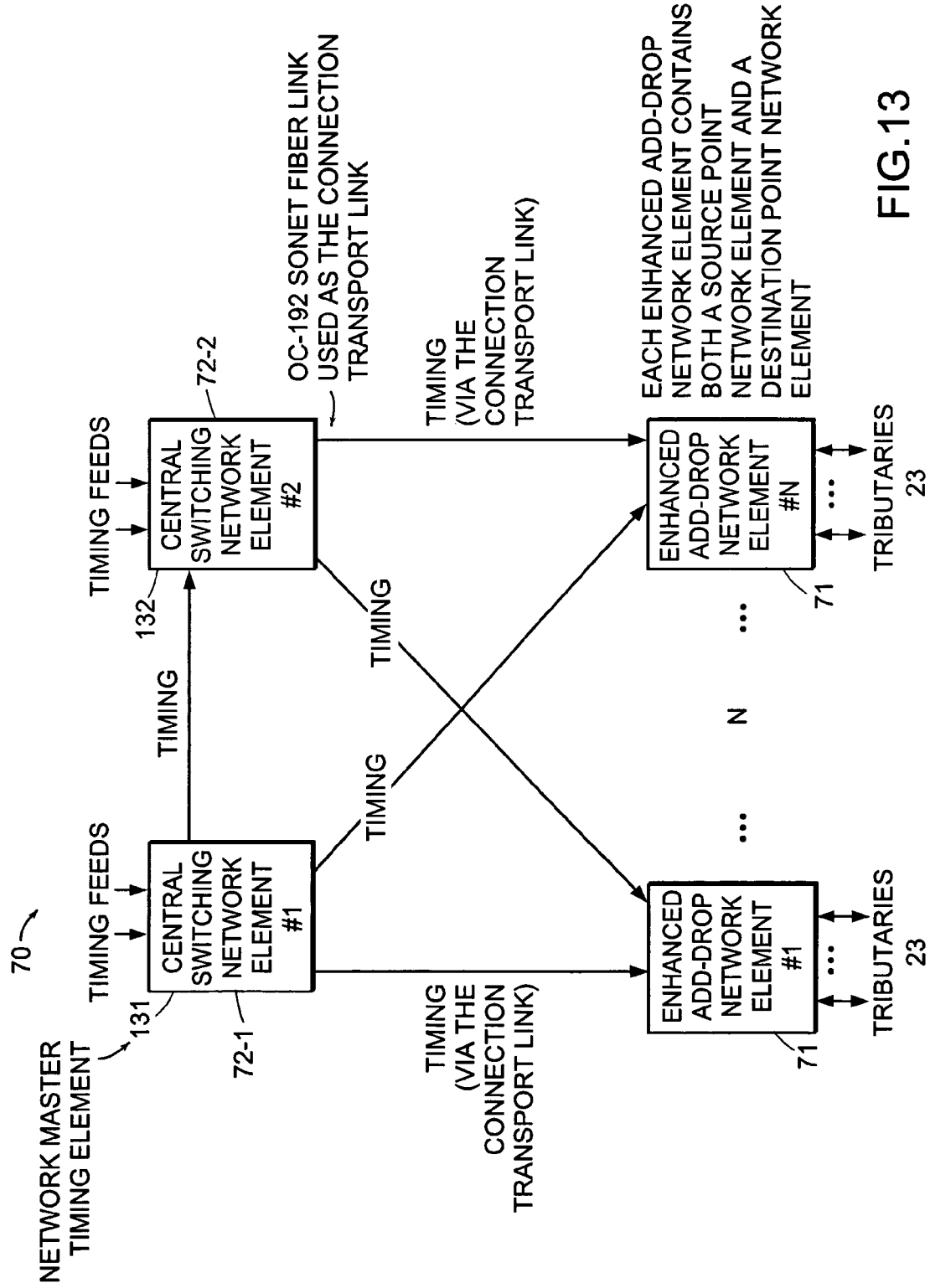
FIG. 13 is a block diagram indicating timing among the network nodes of FIG. 7.

FIG. 13 shows how an exemplary embodiment distributes timing throughout the fault masking network node 70. As can be seen, in the embodiment shown in FIG. 13, both frequency and "link alignment indicator" type phase information is forwarded throughout the system using standard SONET OC-192 links (although, as previously mentioned, links other than OC-192 links could be used without departing from the spirit of the inventions described herein). Continuing to refer to FIG. 13, the central switching network element 72-1 that is serving as the network master timing element 131 distributes frequency and phase information to the second central switching element 72-2 acting as a network slave timing element 132, as well as all the enhanced add-drop network elements 71 within the network node 70. The second central switching network element 72-2 receives frequency and phase information from the central switching network element 72-1 serving as the network master timing element 131, and then also distributes frequency and phase information to all the enhanced add-drop network elements 71 within the network node 70.

Figure 14:
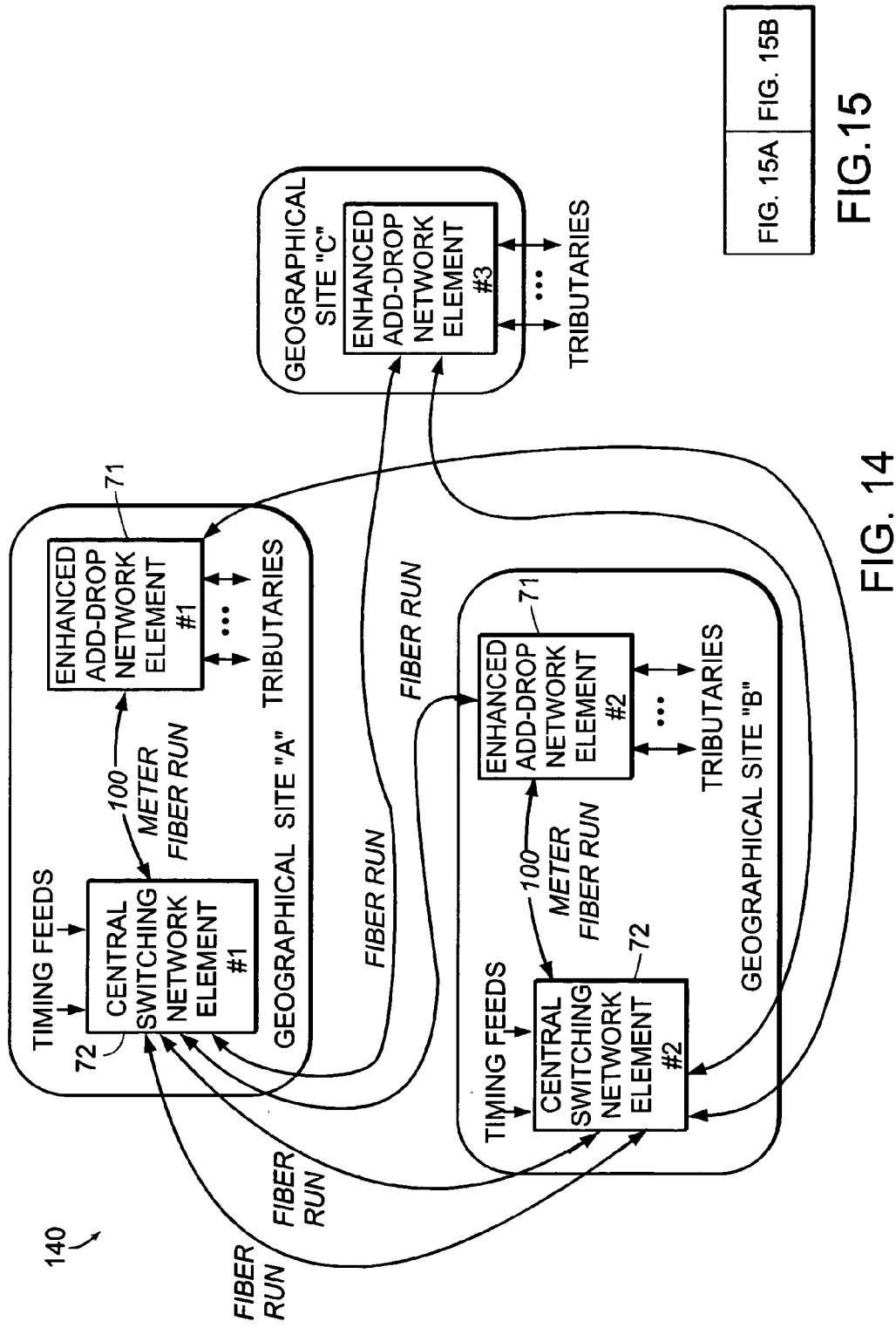
FIG. 14 is a network diagram of a portion of an alternative embodiment of the network elements of FIG. 7.

It should be noted that, although FIG. 7 shows both central switching network elements 72 located at the same geographic location, exemplary embodiments can add robustness by locating one central switching network element at one geographic location and the other central switching network element at a different location, as shown in the exemplary embodiment in FIG. 14. Furthermore, in an exemplary embodiment, one or more enhanced add-drop network element(s) 71 can be co-located with a central switching network element 72 at a given geographic location. This is also shown in FIG. 14.

As previously mentioned, possible sources of skew within the fault masking network include: skew due to the diverse routing of the source fibers 103, skew due to the central switching network elements 72 (under fault conditions), and skew due to the diverse routing of the destination fibers 104. As shown in the exemplary embodiment in FIG. 15, there is a separate skew correction FIFO mechanism associated with each of the three sources of skew within the network. Located within each enhanced add-drop network element are two[1] link level skew correction FIFOs 153: one for the destination fiber link associated with central switching network element #1 and one for the destination fiber link associated with central switching network element #2. Also located in each enhanced add-drop network element are a series of connection level skew correction FIFOs 154 (e.g., cell delay variation (CDV) FIFO capable of accounting for small delays between cells, such as about 10 ft. or delays caused by a fault condition) associated with each connection that is terminated at the enhanced add-drop network element 71. The CDV FIFO's are taught in more detail in Pending U.S. patent application Ser. No. 09/501,930. Also within each central switching network element 72 is one link level skew correction FIFO 151 associated with each source fiber link 103 attached to the element. Only one complete input path and one complete output path is shown in each central switching network element in FIG. 15; however, it should be understood that each central switching network element may contain multiple inputs and outputs.

1.

In an exemplary embodiment, the connection level skew correction FIFOs 154 are used to remove any skew due to the central switching network elements 72. As discussed in reference to FIG. 11, network level faults are a cause of skew due to the central switching network elements. This skew is corrected for at the connection level. The connection level skew FIFOs 154 are sized such that the worst case fault scenarios (with respect to failed fiber links and other faults) do not prevent the cells associated with the same connection from being aligned with one another. In general, the connection level skew FIFOs by themselves can work in an environment where: 1) the two central switching network elements are co-located (so that there is virtually no skew between them), 2) the two source fiber links 103 from a given enhanced add-drop network element 71 to the two central switching network elements 72 are of equal length (so that the propagation delay is equal on both links), and 3) the two destination fiber links 104 to a given enhanced add-drop network element 71 from the two central switching network elements 72 are of equal length (so that the propagation delay is equal on both links).

Since the two source fiber links 103 from a given enhanced add-drop network element 71 can be different lengths, the source fiber skew correction FIFOs within the central switching network elements are used to correct for the difference in propagation delay between the two source fibers. Similarly, since the two destination fiber links 104 to a given enhanced add-drop network element 71 are allowed to be different lengths, the destination fiber skew correction FIFOs within the enhanced add-drop network elements 71 are used to correct for the difference in propagation delay between the two destination fibers. Since any skew between the internal timing of the "slaved" central switching network element and the central switching network element serving as the network master timing element shows up as additional skew between the destination fiber links at the enhanced add-drop network element, this skew source can also be corrected for by the destination fiber skew correction FIFOs. With respect to the source fiber links 103, the same additional skew (due to non-co-located switching network elements) can be corrected for with the source fiber skew correction FIFOs at the central switching network elements.

Using this exemplary embodiment "Two-Level" skew correction technique (i.e., link level then connection level) allows the expensive connection level skew FIFOs 154 to remain relatively small in size, thus making the network less costly overall compared to resolving all sources of network skew within the connection level skew FIFOs 154. In this exemplary embodiment, each enhanced add-drop network element 71 only terminates a single connection transport link 81 (FIG. 8B) from each central switching network element. It is possible to construct an enhanced add-drop network element that can terminate more than one connection transport link 81 from each central switching network element 72. In such an embodiment, an enhanced add-drop network element 71 that terminates N connection transport links 81 from each central switching network element 72 contains 2N link level skew correction FIFOs 153. It should be noted that if K sub-links are multiplexed into a single connection transport link 81, and if the destination fiber skew correction is performed at the sub-link level, then there will be 2KN link level skew correction FIFOs in each enhanced add-drop network element 71.

Figure 16:
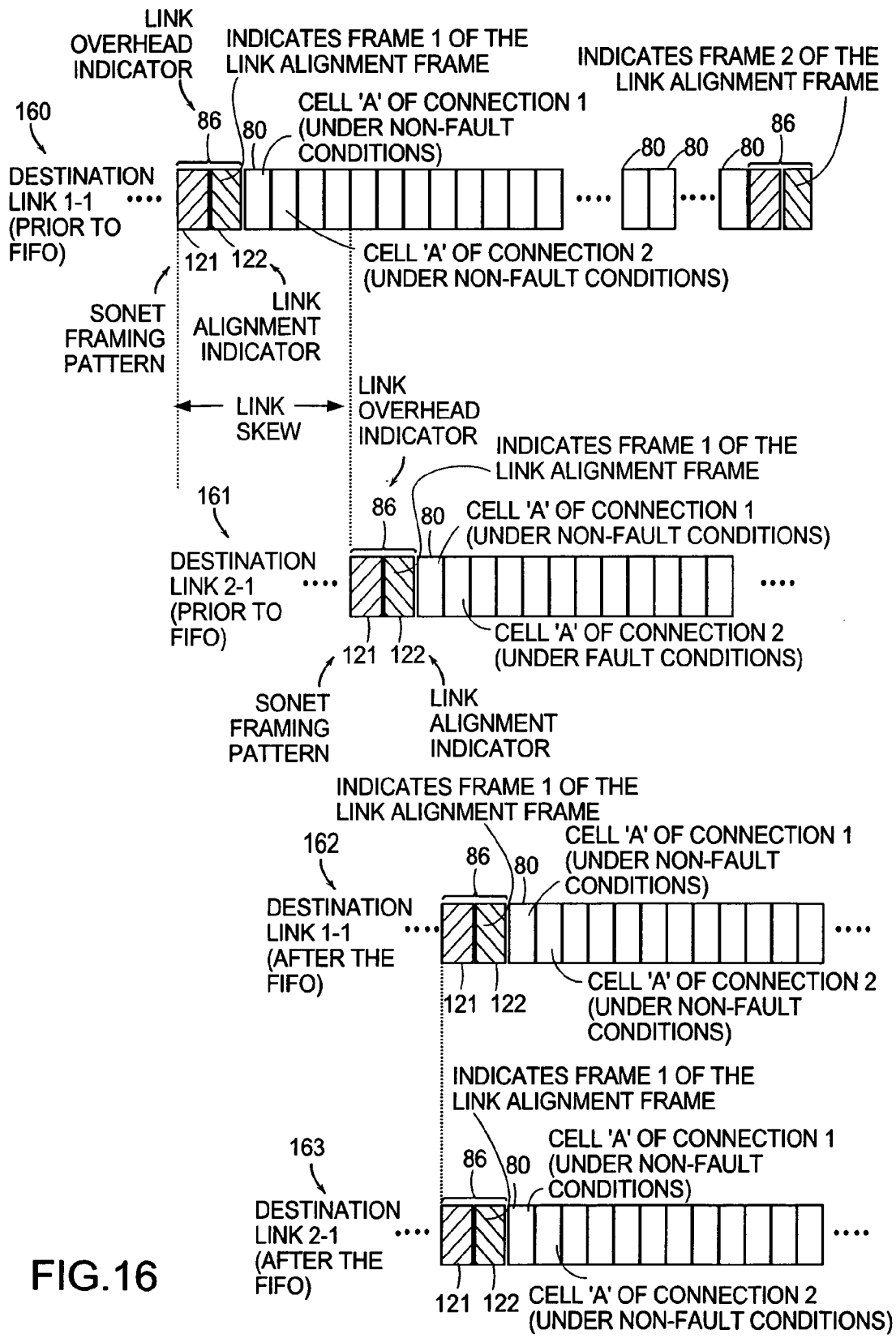
FIG. 16 is a timing diagram of connection transport links of FIG. 8B undergoing a link alignment process.

FIG. 16 illustrates exemplary embodiment operation of the destination fiber skew correction FIFOs. Prior to the link level skew correction FIFOs, there is some amount of skew between the data on the two destination fibers 160, 161. After exiting the link level skew correction FIFOs, the skew has been removed and the two links 162, 163 are now perfectly aligned.

Figure 17A:
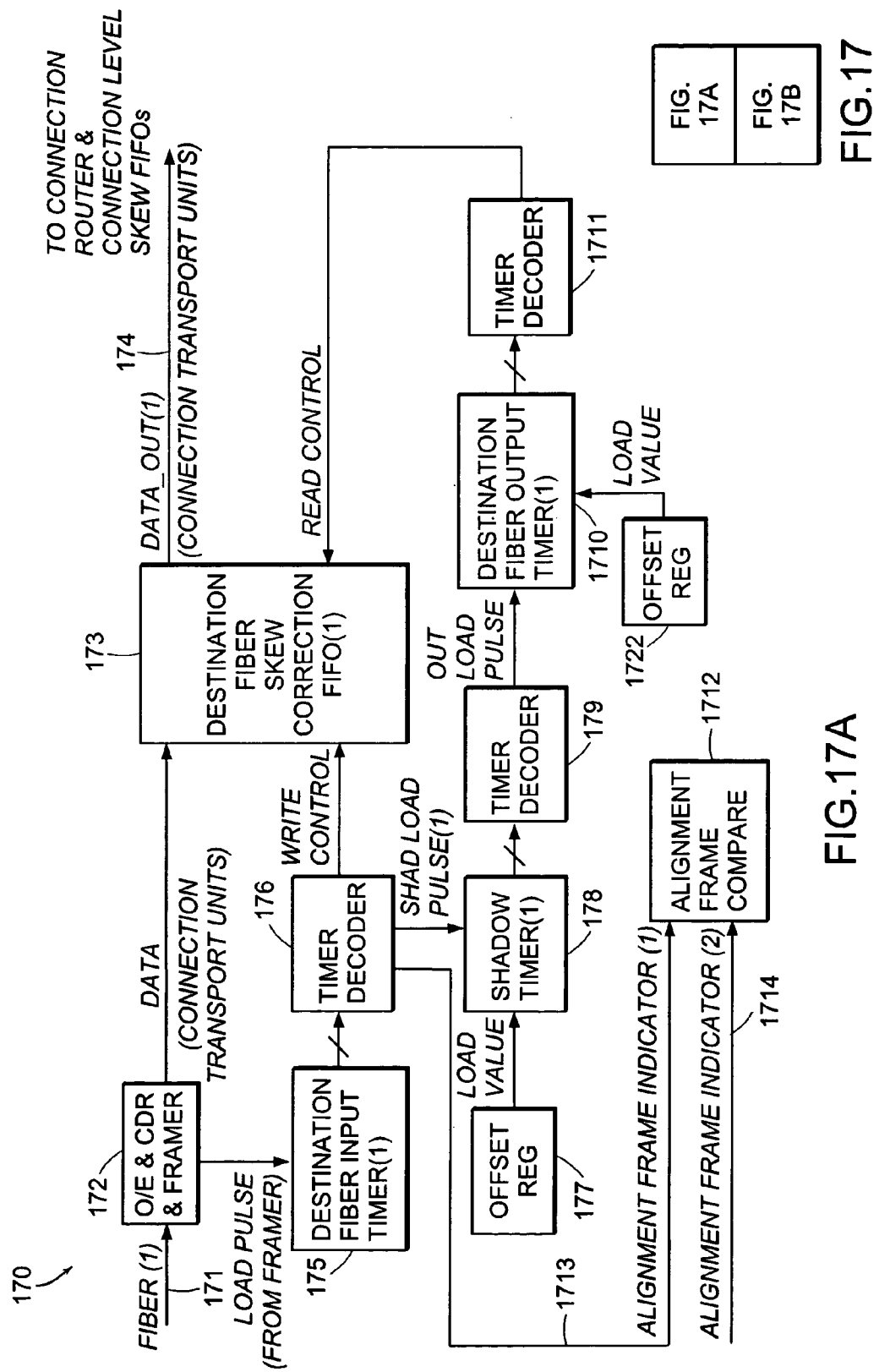
FIG. 17 is a schematic diagram of skew correction circuits used in the add-drop network elements of FIG. 7.
Figure 17B:
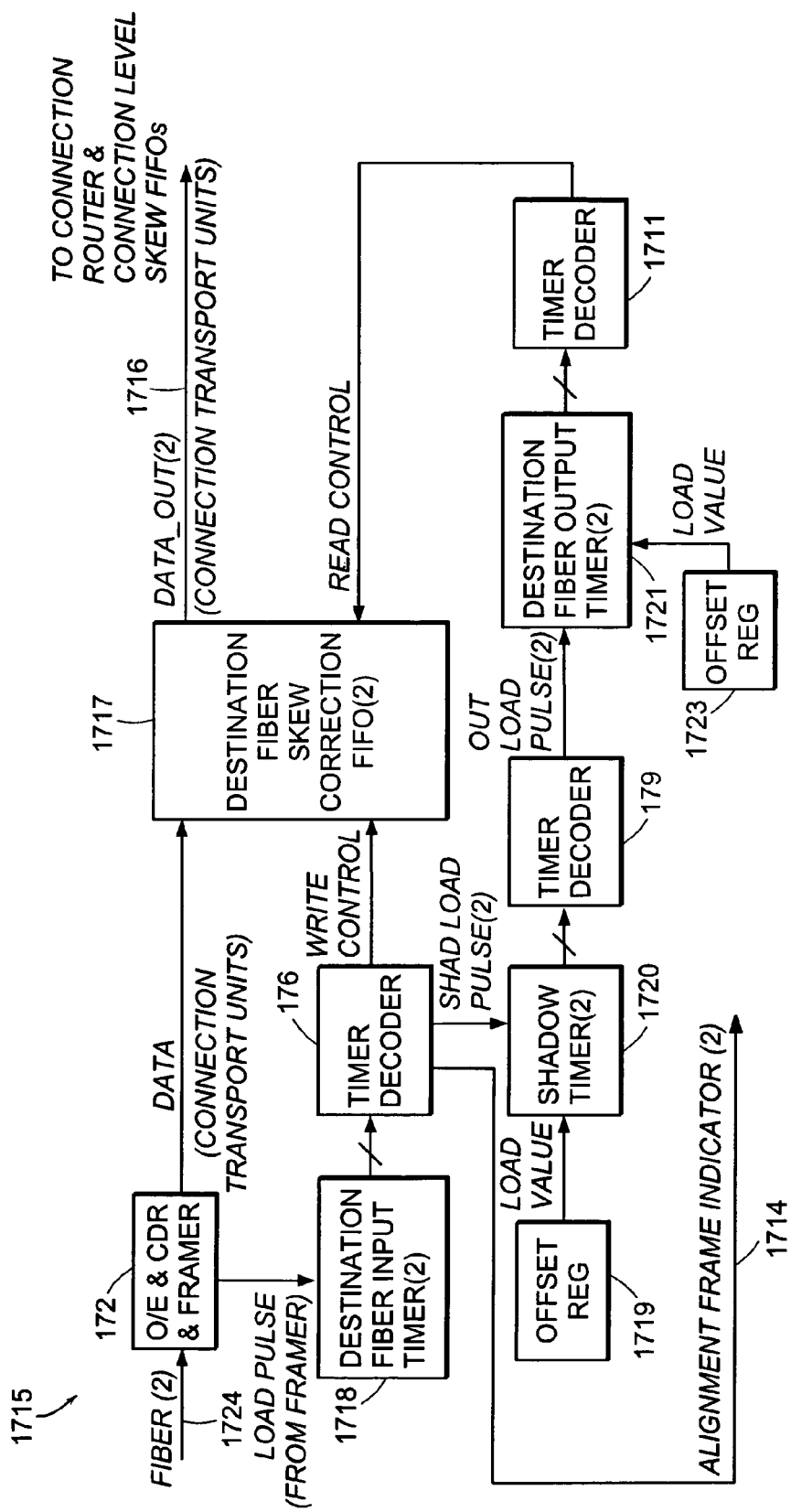

FIG. 17 shows exemplary embodiment circuitry 170, 1715 surrounding the two destination fiber skew correction FIFOs within an enhanced add-drop network element. Typically, the circuitry 170, 1715 associated with one of the two input fibers will be designated as the "Master" circuitry, and the circuitry associated with the other fiber will be designated as a "Slave" circuitry. It should be noted that the "master" circuitry within the enhanced add-drop NE 71 refers to different circuitry from the "network master timing element" circuitry within the central switching network element 72. In FIG. 17, either circuitry 170 or 1715 can serve as the master. However, for the purposes of discussion, circuitry 170 is designated as the master.

The two destination level skew correction FIFOs 173, 1717 are sized such that the worst case skew between FIBER(1) 171 and FIBER(2) 1724 can be accommodated when the skew FIFO associated with the master circuitry is centered. For instance, for purposes if this discussion, it is assumed that a single connection transport unit 80 takes 100 ns to transmit over the fiber between two network elements. It is also assumed each skew FIFO storage location can accommodate one connection transport unit 80, and that the skew FIFO can hold a total of eight connection transport units 80. Then, if the master's skew FIFO is centered, the enhanced add-drop network can correct for up to ±400 ns of skew between the two fibers. In general, if M is the total number of storage locations within the skew FIFO and T is the time that is required to transmit the data that is stored in one skew FIFO memory location, then C is the skew correction capability of the FIFO and can be calculated from the following equation:

$C=(M \times T)/2$

Figure 18:
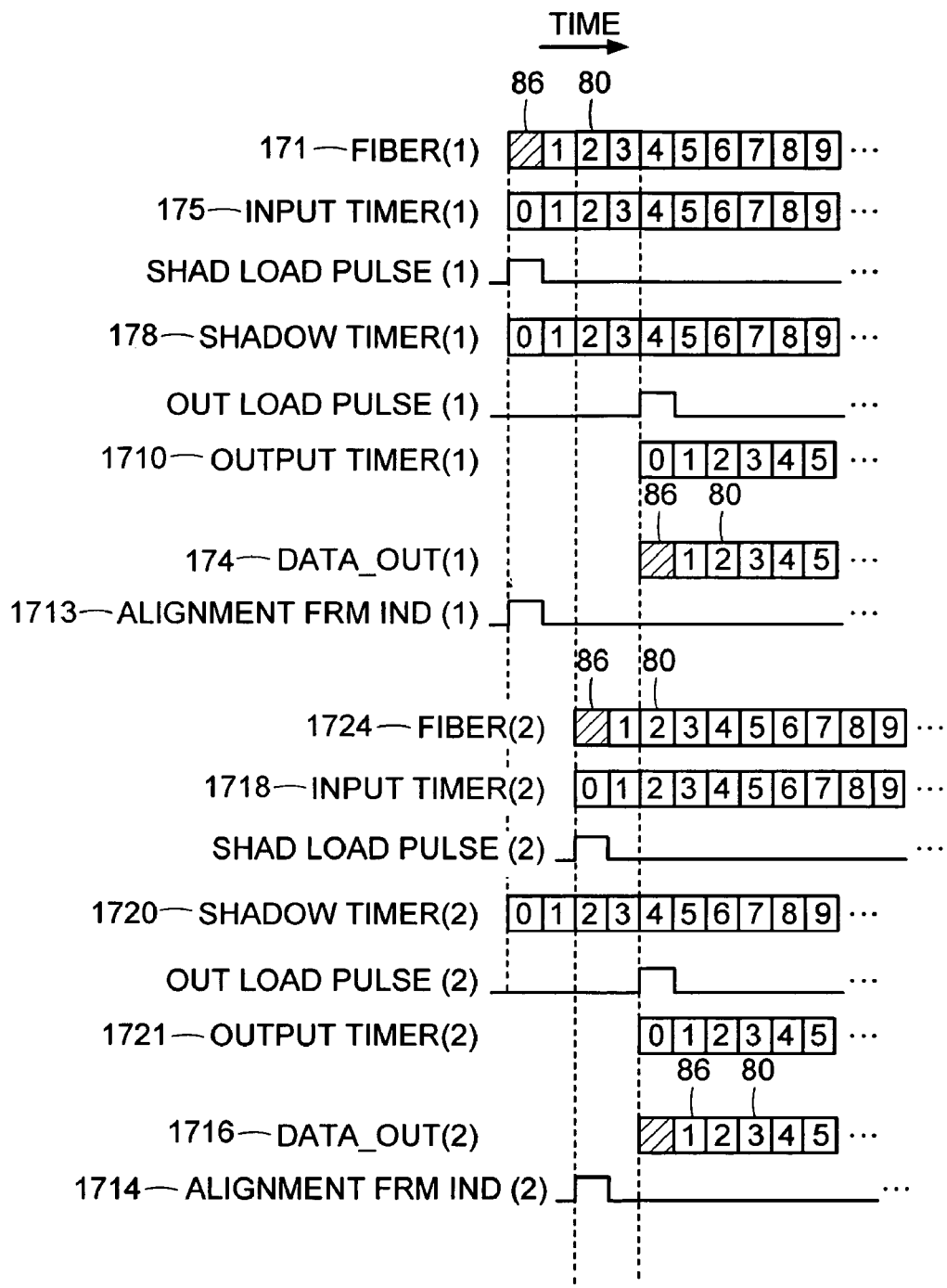
FIG. 18 is a timing diagram occurring in the circuits of FIG. 17.

Assuming (as an example) that each link level skew FIFO contains eight memory locations, FIG. 18 illustrates exemplary embodiment timing associated with the skew correction circuitry of FIG. 17. In FIG. 18, FIBER(2) 1724 is skewed from FIBER(1) 171 by two connection transport units 80. However, at the output of the two FIFOs, the data streams associated with the two fibers 174, 1716 are perfectly aligned (with respect to the link overhead indicators 86). This is accomplished as described below.

The fiber data first enters circuit block 172. This block converts the optical signal to an electrical signal, recovers clock and data from the electrical signal, and then locates the framing information associated with the link. Based upon the location of the framing information within the link, a "load pulse" is generated every link alignment frame period 123. This load pulse is used to load the destination fiber input timer 175, 1718. As shown in FIG. 18, the input timer 175, 1718 is aligned with the fiber data such that timer count 0 aligns with the link overhead indicator 86, timer count 1 aligns with connection transport unit #1, timer count 2 aligns with connection transport unit #2, etc. FIG. 18 shows simplified exemplary embodiment timing diagrams.

In the exemplary embodiment of FIG. 18, the input data experiences no delay through 172. Also, the link overhead indicator 86 can be stored in one storage location of the FIFO. It should be noted that (unlike the example) it is not necessary to store the link overhead indictor 86 into the skew FIFO if a link alignment frame indicator 122 is also embedded into the identification indicator 82 of the first connection transport unit 80 of the connection transport link 81. Assuming that the link overhead indicator 86 requires the same amount of link bandwidth as one connection transport unit 80, if the number of connection transport units 80 plus the number of link overhead indicators 86 within a link alignment frame 123 is divisible by the size (in connection transport units 80) of the skew FIFO, then the first link overhead indicator 86 of the link alignment frame 123 is always written into the same storage location (not shown) within the skew FIFO 173, 1717. If it is assumed that the first link overhead indicator 86 of the link alignment frame 123 is always written into location 0, then the skew FIFO output circuitry always knows what location within the skew FIFO 173, 1717 the first link overhead indicator 86 is stored. For instance, if each link alignment frame 123 contains only one link overhead indicator 86 and 23 connection transport units 80, since 23+1 is divisible by 8 (where 8 is the size of the skew FIFO 173, 1717), the link overhead indicator 86 is always written into the same location once framing has been established.

The output of the destination fiber input timer 175, 1718 is used to drive the timer decoder 176 associated with this timer. This timer decoder 176 is used to generate three signals: (i) the control signals used to write data into the FIFO 173, 1717, (ii) the alignment frame indicator 1713, 1714, and (iii) the shadow timer load pulse. The shadow timer 178, 1720 is loaded with an offset value such that the shadow timers in both the master and slave circuitry 170, 1715 are in perfect phase alignment with the destination fiber input timer of the master circuitry. (The shadow timer "shadows" the phase of the destination fiber input timer of the master.) Within the master circuitry 1715, the shadow timer 1720 is always loaded with a value of 0. Within the slave circuitry, the shadow timer is loaded with a value that is equal to the difference between the phases of the data on the two input fibers.

The output of the shadow timer 178 is used to drive the timer decoder 179 associated with this timer. This timer decoder 179 is used to generate the load pulse to the destination fiber output timer 1710, 1721. The load pulse is generated such that when a value of 0 is loaded into the output timer, the skew FIFO associated with the master circuitry 170 is perfectly centered. The output timer is used to determine the time when a given storage location within the skew FIFO is read. The same "hard coded" value is decoded from the outputs of both the master and slave shadow timers, and the offset register values in 1722 and 1723 are the same for both the master and the slave. Therefore, since the two shadow timers are in perfect phase with one another (since they are both in perfect phase with the input timer of the master), the output timers 1710, 1721 of both the master and the slave are in perfect alignment with one another. In the timing example of FIG. 18, the skew FIFOs contain 8 storage locations. Therefore, in order to center the FIFO on the master, a value of 4 is decoded off of the shadow timer (OUT LOAD PULSE(1)). This causes the output timer to be at location 0 when the input timer on the master is at location 4 (as shown in FIG. 18). Therefore, on the master, the link overhead indicator 86 is read out of the FIFO four periods after the indicator is written into the FIFO, and, therefore, the FIFO is perfectly centered on the master.

On the slave, the link overhead indicator 86 is read out of the slave skew FIFO 1717 at exactly the same time that the link overhead indicator 86 is read out of the master skew FIFO 173 (because of reasons previously explained). However, since the phase of the input timer on the slave is used to write data into the skew FIFO, the link overhead indicator 86 is written in to the slave skew FIFO 173 only two periods before it is read. Therefore, the slave's skew FIFO 1717 is not centered, and it is off-center by an amount equal to the phase difference between the FIBER(1) 171 and FIBER(2) 1724 inputs. It should be noted that if the slave input fiber data leads the master input fiber data by two periods (instead of lagging by two periods as in FIG. 18), then the link overhead indicator 86 is written into the slave FIFO two periods before the link overhead indicator is written into the master skew FIFO 173. In this case, the slave skew FIFO 1717 operates in the ¾s full state, rather than the ¼ full state of the FIG. 18 example. However, as in the FIG. 18 example, the link overhead indicators 86 on both the slave and the master are still read out of the FIFOs at the same time.

As previously mentioned, the offset value of the shadow timer of the slave is determined based upon the difference in phase between the data on the two input fibers. This "phase difference" is determined by an Alignment Frame Compare block 1712. This is done by having both the master and the slave forward an alignment frame indicator to the Alignment Frame Compare block 1712. As shown in FIG. 18, the alignment frame indicator 1713, 1714 is generated at the start of the link alignment frame 123 associated with the data on the input fiber. In the example of FIG. 18, there is a two period phase difference between the two alignment frame indicators 1713, 1714. Therefore, the shadow timer 1720 of the slave circuit 1715 is loaded with a value of 2 (instead of the value of 0 that is loaded into the master's shadow timer 178). This forces the shadow timer 1720 on the slave 1715 to be in perfect alignment with the shadow timer 178 on the master 170 (as shown). It should be noted that placing the slave circuitry 1715 on a separate physical module than that of the master circuitry 170 adds greater robustness to the enhanced add-drop NE 71. If this is done, each module contains an Alignment Frame Compare circuit 1712, but the circuit is only used on the module that is acting as the slave.

The offset registers 1722, 1723 associated with the output timers are both initialized to a value of zero for "maximum" skew compensation. However, if one has some knowledge of the skew between the two input fibers, the offset registers can be initialized to a value greater than zero. This has the effect of making the FIFOs 173, 1717 smaller, which results in less delay through the FIFOs.

Once the two data streams 174, 1716 leave the circuitry of FIG. 17, the circuitry has removed any skew between the two streams which developed between the time at which the streams left the central switching network element and the time at which the streams arrived at the add-drop network element 71. Therefore, at this point, assuming that the identical cells of a given connection are simultaneously presented to the two central switching network elements 72, the only skew that still exists between the identical cells of a given connection is the skew due to the central switching network elements 72 during fault conditions (i.e., the skew illustrated in FIG. 11). This last amount of skew is removed by the connection level skew correction FIFOs 154 of FIG. 15.

Figure 15:
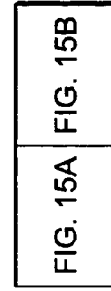
FIG. 15 is a detailed schematic diagram of the central switching network element and enhanced add-drop network element of FIG. 7.
Figure 15A:
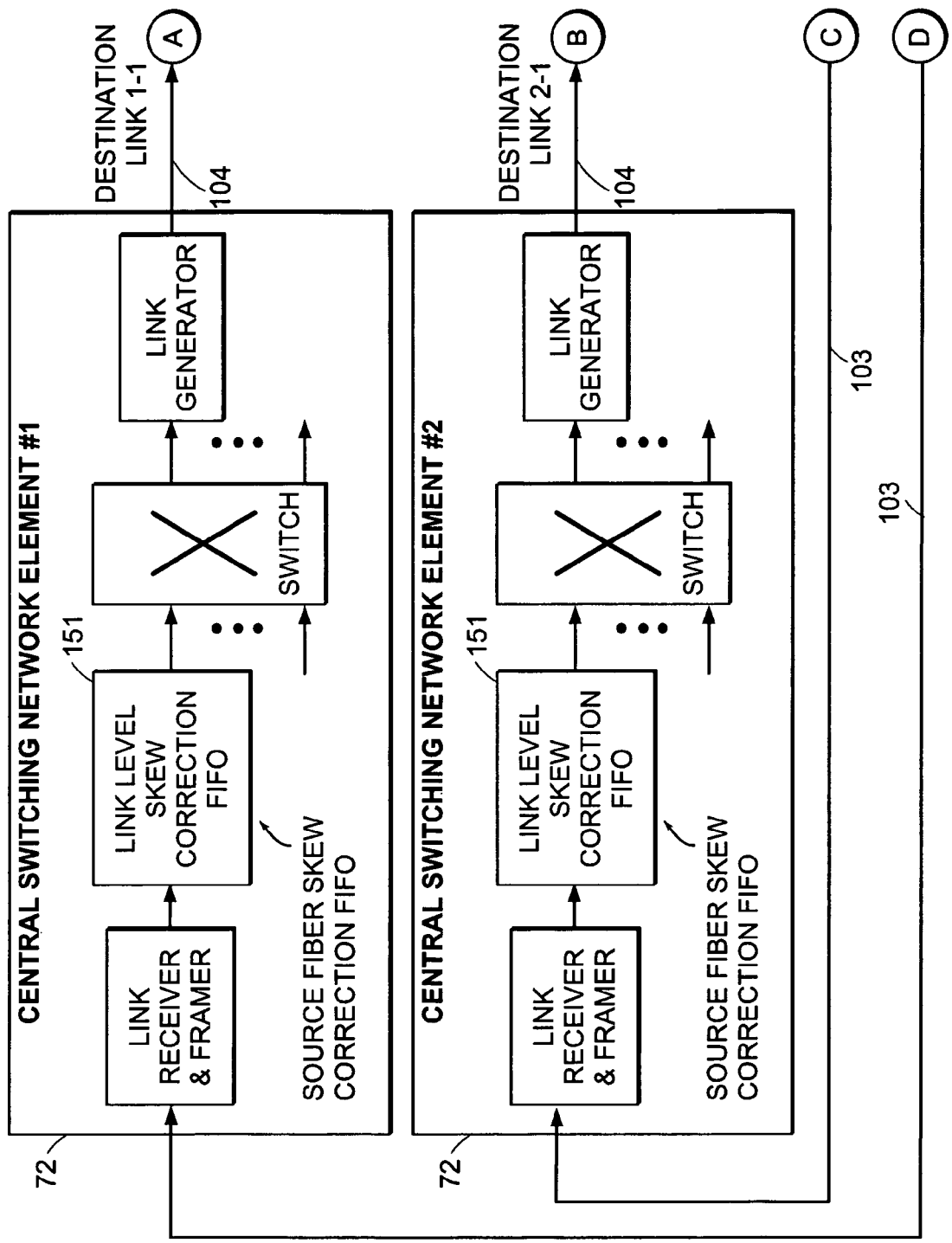

Only if the identical cells of a given connection are substantially simultaneously presented to the two central switching network elements 72 can the destination fiber skew correction FIFOs and the connection level skew correction FIFOs remove the skew developed between the identical cells of a given connection. The data on the two source fibers associated with a given enhanced add-drop network element 71 must be aligned at the two central switching network elements 72 in order for the identical cells of a given connection to be presented simultaneously to the two central switching network elements. As shown in FIG. 15, link level skew correction FIFOs (that are located in the central switching network elements) are used to align the data associated with two source fiber links of a given enhanced add-drop network element.

Figure 19:
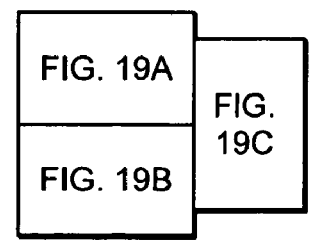
FIG. 19 is a detailed schematic diagram of a portion of the network of FIG. 7.
Figure 19A:
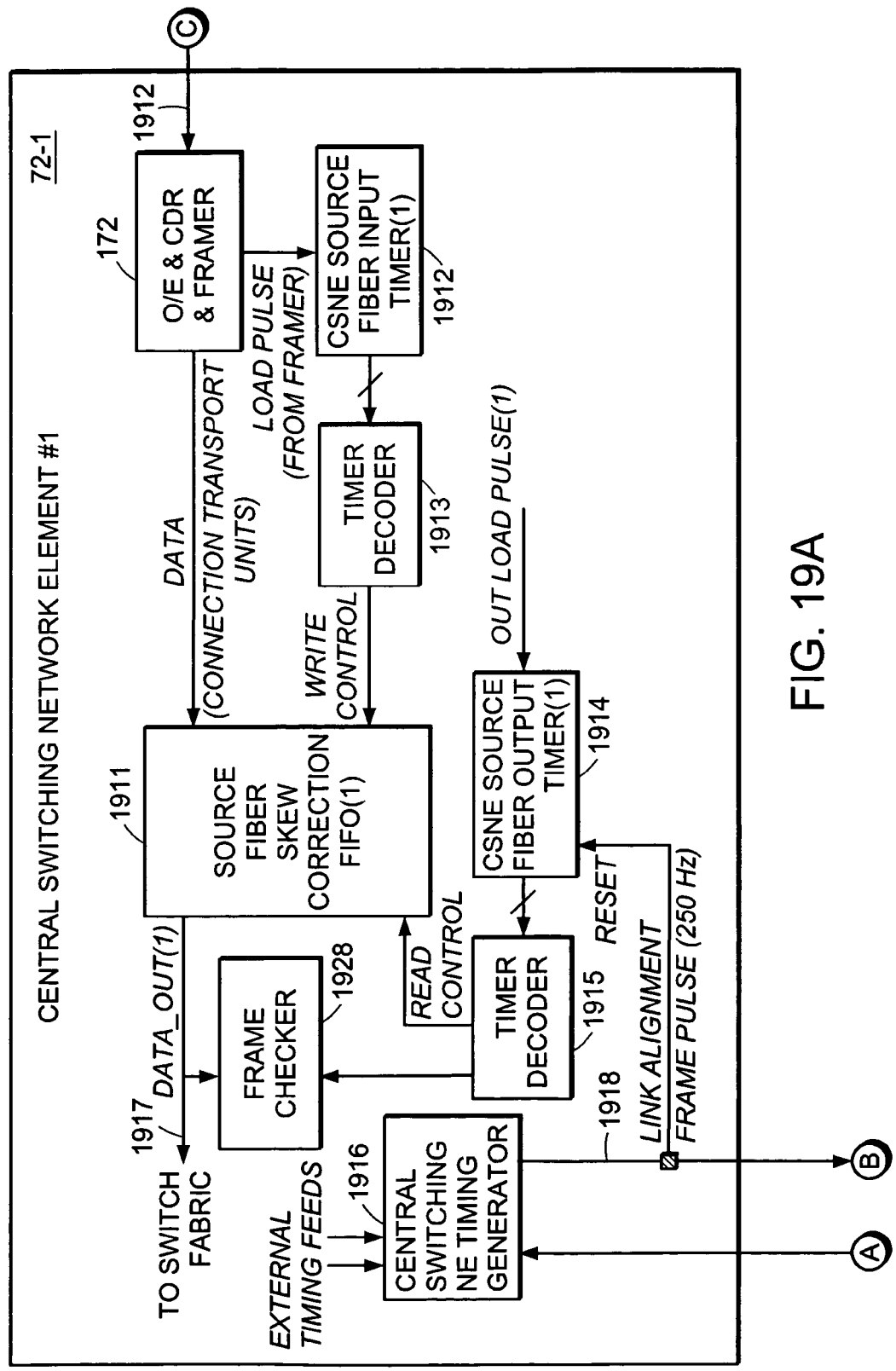
Figure 19B:
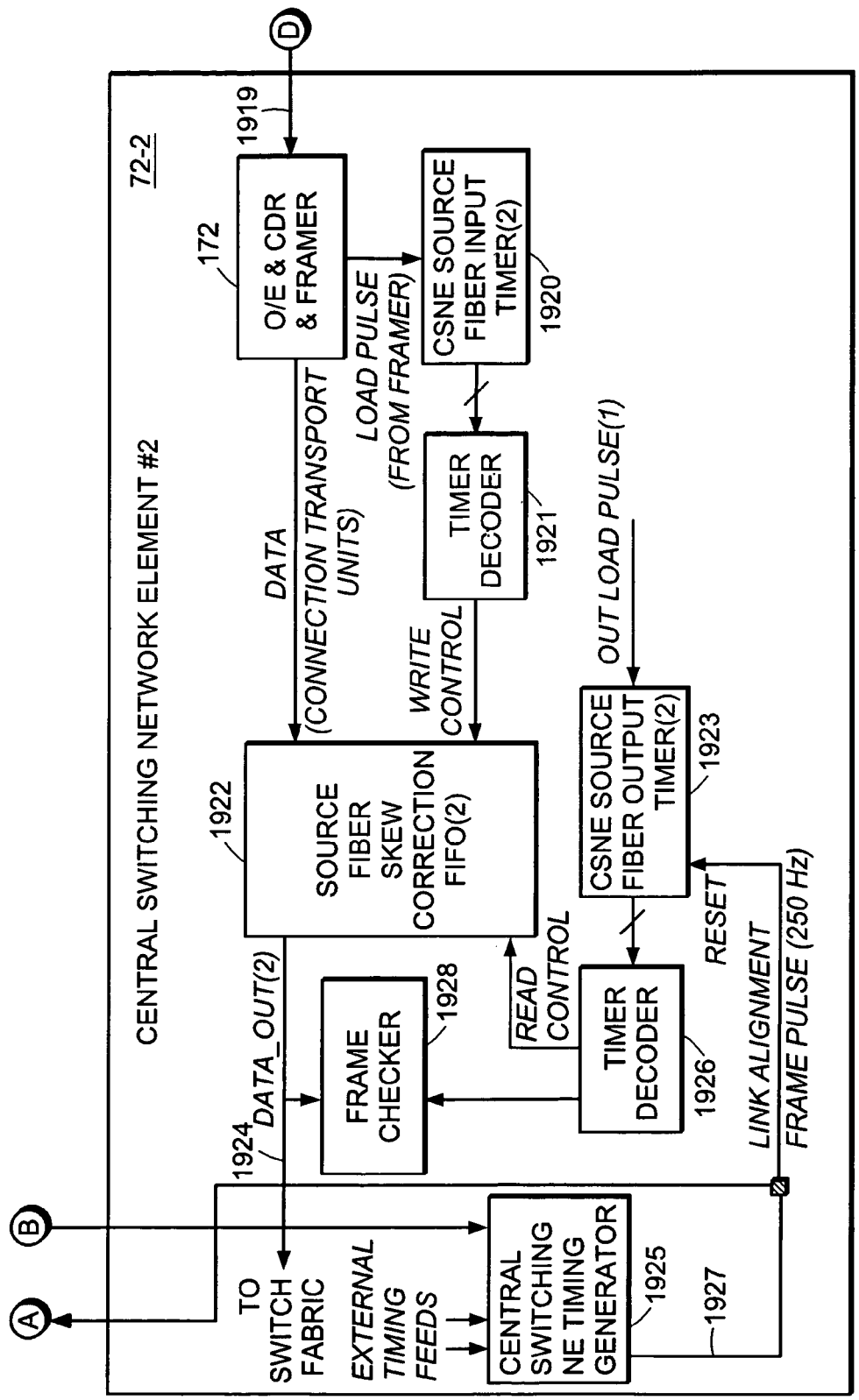
Figure 19C:
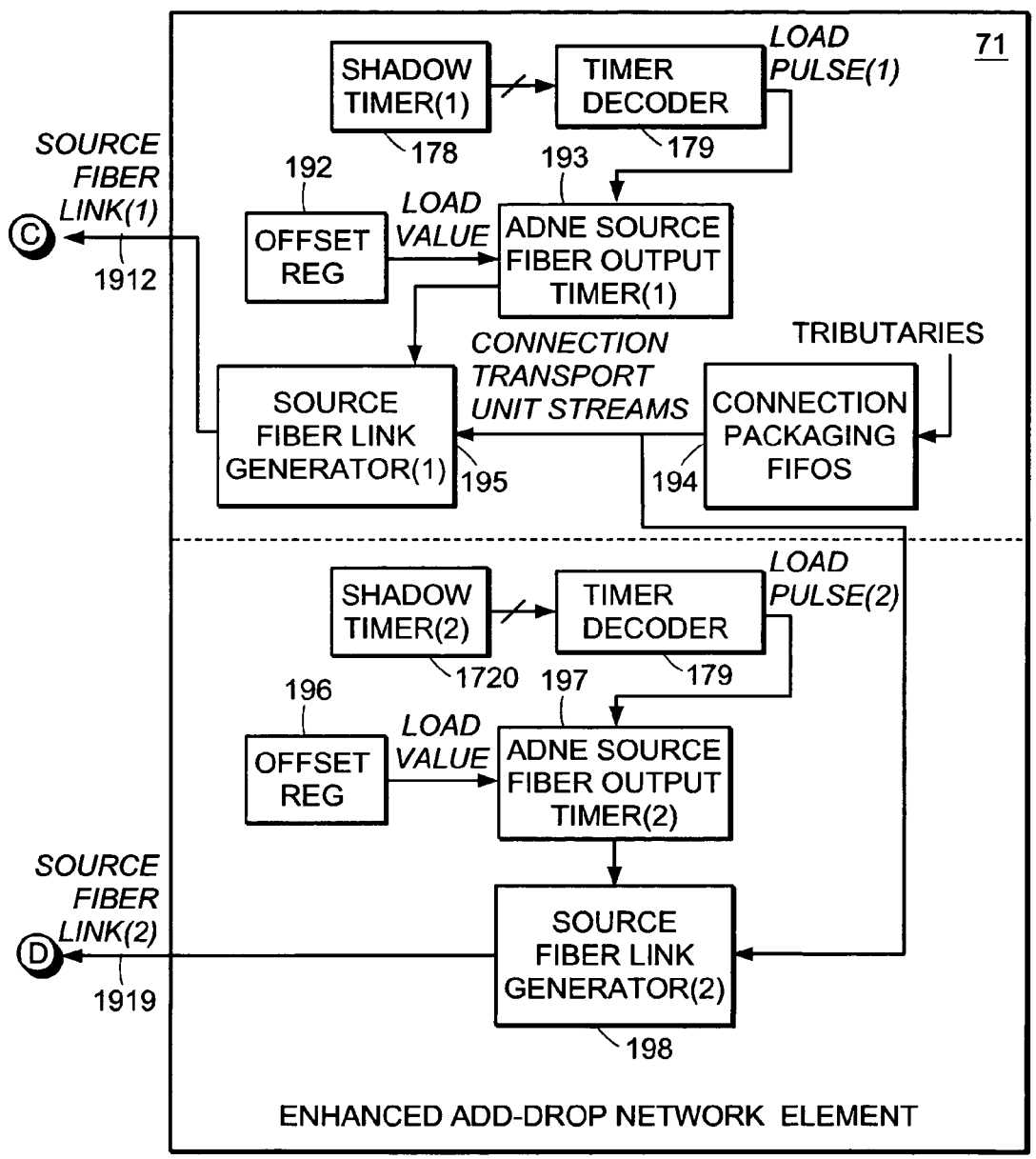

FIG. 19 shows in greater detail the exemplary embodiment components involved in the alignment of the source fiber links to the central switching network elements. As was discussed in reference to FIG. 13, one central switching network element is designated as the network master timing element. The master timing central switching NE generates the link alignment frame pulse 1918 or 1927 for both central switching NEs. It is used directly on the master timing element and indirectly on the slaved switching element. On the slave NE, the link alignment frame pulse from the master NE may drive a Phase Locked Loop (PLL) on the slave NE, which regenerates a phased aligned version of the pulse on the slave NE.

The result should be that the link alignment frame pulses within two co-located central switching elements are in very close alignment with one another. This alignment pulse is (i) used to synchronize the switching of data within the central switching NEs, (ii) used to generate the link overhead indicators within the connection transport links leaving the central NEs, and (iii) used to align the connection transport links (i.e., the source fiber links) that are arriving at the central switching NEs.

The link alignment frame pulse within each central switching element is used to load the Central Switching Network Element (CSNE) source fiber output timer 1914, 1923. The timer decoder associated with each CSNE source fiber output timer generates the control signals needed to read the connection transport units out of the source fiber skew correction FIFO 1911, 1922, in the same manner that the connection transport units are read out of the destination fiber skew correction FIFO. For instance, during the period when the link alignment frame pulse is active, the central switching network element reads location 0 of the skew FIFO and expects to read out the link overhead indicator 86. It is the responsibility of the enhanced add-drop NE 71 to make sure that the link overhead indicator is stored in location 0 of the source fiber skew correction FIFO at the time when the central switching element expects to read it from that location. Since the timing of both central switching elements are tightly aligned with one another (due to the exchange of the link alignment frame pulses), when one central switching NE reads the link overhead indicator from location 0 of its skew FIFO, the other central switching NE will also read the link overhead indicator from location 0 of its skew FIFO. Since the same cells of a given connection are sent on both source fiber links at the same locations in the source fiber links (with respect to the link overhead indicator), the cells of a given connection will be presented to the switch fabrics of both central switching elements at the same time.

As previously mentioned, it is the responsibility of the enhanced add-drop NE 71 to make sure that the link overhead indicator is stored in location 0 of the source fiber skew correction FIFO at the time when the central switching element expects to read it from that location. It accomplished this as follows. The shadow timers 178, 1720 in FIG. 19 are the same shadow timers that are in FIG. 17. As previously discussed, shadow timers 178 and 1720 are in perfect phase alignment with one another. The timer decoder driven by each shadow timer generates a load pulse such that the associated Add-Drop Network Element (ADNE) source fiber output timer 193, 197 is loaded when the respective shadow timer is at 0. Therefore, each of the two ADNE source fiber output timers are loaded at the same time.

The ADNE source fiber output timers determine when the link overhead indicators 86 are inserted into the source fiber links. If the two ADNE source fiber output timers are loaded with the same offset register value, they are in perfect phase alignment with one another, and, therefore, the link overhead indicators 86 on the two links are in perfect alignment with one another when they leave the enhanced add-drop network element. Since connection transport units out of 194 are bridged to both source fiber link generators, the cells associated with a given connection are perfectly aligned with one another on the two source fiber links when they leave the enhanced add-drop network element.

A frame checker 1928 at the output of each skew FIFO within the central switching NEs is used to check to see if the link overhead indicator (marking the start of the link alignment frame) is stored in location 0 of the skew FIFO when it is suppose to be. If it is not, then an out-of-frame condition is recorded at the output of this skew FIFO, and this information is sent back to the enhanced add-drop network element (using an alarm referred to as the YELLOW_SYSTEM_MFRAME alarm). The offset register of the ADNE source fiber output timer serving as the master is then adjusted until the frame checker 1928 indicates that framing is achieved. Adjusting the offset register of the ADNE source fiber output timer has the effect of moving the phase of the data on the source fiber link with respect to the link alignment pulse within the central switching NE. The offset register of the master ADNE source fiber output timer is then continued to be adjusted until the upper and lower boundaries of the FIFO are located. At this point a value is written to the offset register of the master ADNE source fiber output timer such that the associated skew FIFO within the central switching NE is perfectly centered. This same offset value is written to the offset register of the other (i.e., the slave) ADNE source fiber output timer. The skew FIFO within the associated central switching NE of the slave is then off-center by an amount equal to the skew between the two source fiber links. If the two source fiber links are skewed with respect to one another, the same cells of a given connection are written into the two skew FIFOs at different points in time, but are read out of the two FIFOs at the same time, as is the case for the link level skew FIFOs within the enhanced add-drop network element.

It should be noted that in another exemplary embodiment, the source fiber skew correction FIFOs can be located at the output of the enhanced add-drop network element 71 instead of within the central switching network element 72.

Once the three types of skew FIFOs are operating correctly, the cells of a given connection are aligned with one another at the enhanced add-drop network element. Once a cell of a connection from one destination fiber link is aligned with the same exact cell from the other destination fiber link, the better cell selection process can take place. If both cells are present, the connection transport unit integrity indicator 84 is recomputed from the connection transport unit payload and compared to the connection transport unit integrity indicator that is part of the received cell. Based upon this, if one cell is received with errors and the same cell from the other destination fiber link is received with no errors, then the "good" cell is forwarded on to the tributaries and the bit errors are effectively masked. If a fiber is cut somewhere in the system such that cells of a given connection no longer arrive at the add-drop NE from one destination fiber link, then the "better cell" selector selects cells immediately from the other destination fiber link, since it can identify when a cell from one central switching NE is present and the same cell from the other central switching NE is not present. It should be noted that each connection is free to take the better cell from either of the two destination fiber links on a cell by cell basis.

Also, each cell of a connection carries a sequence number in its connection transport unit identification indicator 82. Therefore, if a cell from one central switching NE has been dropped (because of a bad header), then the "better cell" selector identifies the drop based upon the sequence numbers and takes the missing cell from the opposite central switching NE.

As previously discussed, the offset register of the ADNE source fiber output timer serving as the master is adjusted such that the source fiber skew correction FIFO on the corresponding central switching NE is perfectly centered. The following paragraphs discuss the algorithms associated with this process in greater detail.

The central switching network elements 72 can be designed such that they are capable of measuring the "round trip" fiber delay associated with a given central switching network element 72 and its paired enhanced add-drop network element 71, or more generally, Network Interface Module (NIM). Hardware can be added to forward this "round trip" delay back to the NIM so that its firmware can use it to center the skew FIFO 1911, 1922 on the CSNE 72 without performing an iterative algorithm. However, this method of centering the CSNE skew FIFO 1911, 1922 requires detailed knowledge of some of the fixed delays within the system. These delays could possibly change in the future, thus causing the CSNE skew FIFO to be off-centered unless firmware on the NIM is modified to reflect the changed delay values. A technique is now presented that centers the CSNE skew FIFO without knowledge of the fixed delays within the network node 700.

Figure 20:
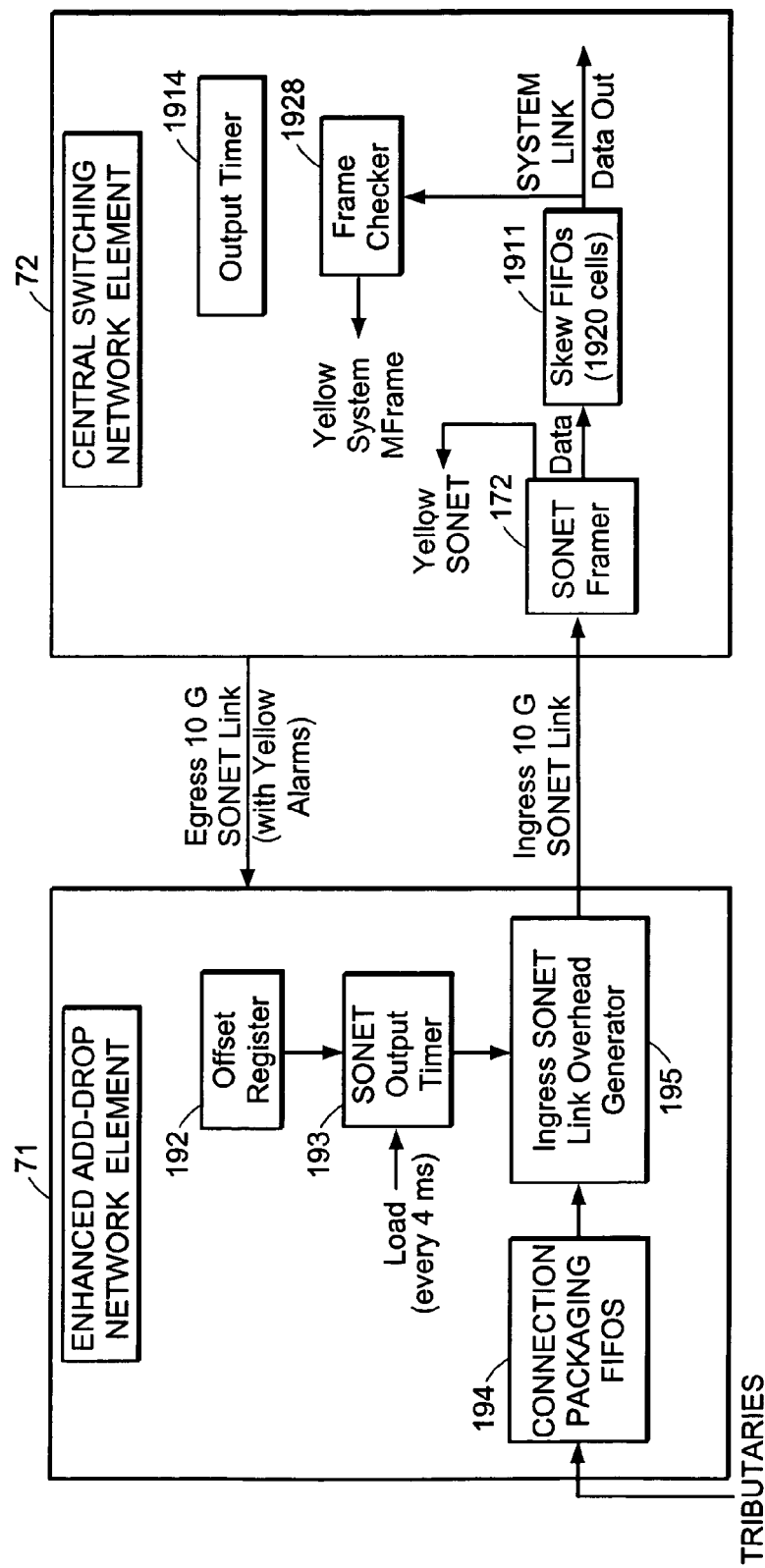
FIG. 20 is a schematic diagram of alignment components used to align signals between the central switched network elements and enhanced add-drop network elements of FIG. 19.
Figure 21A:
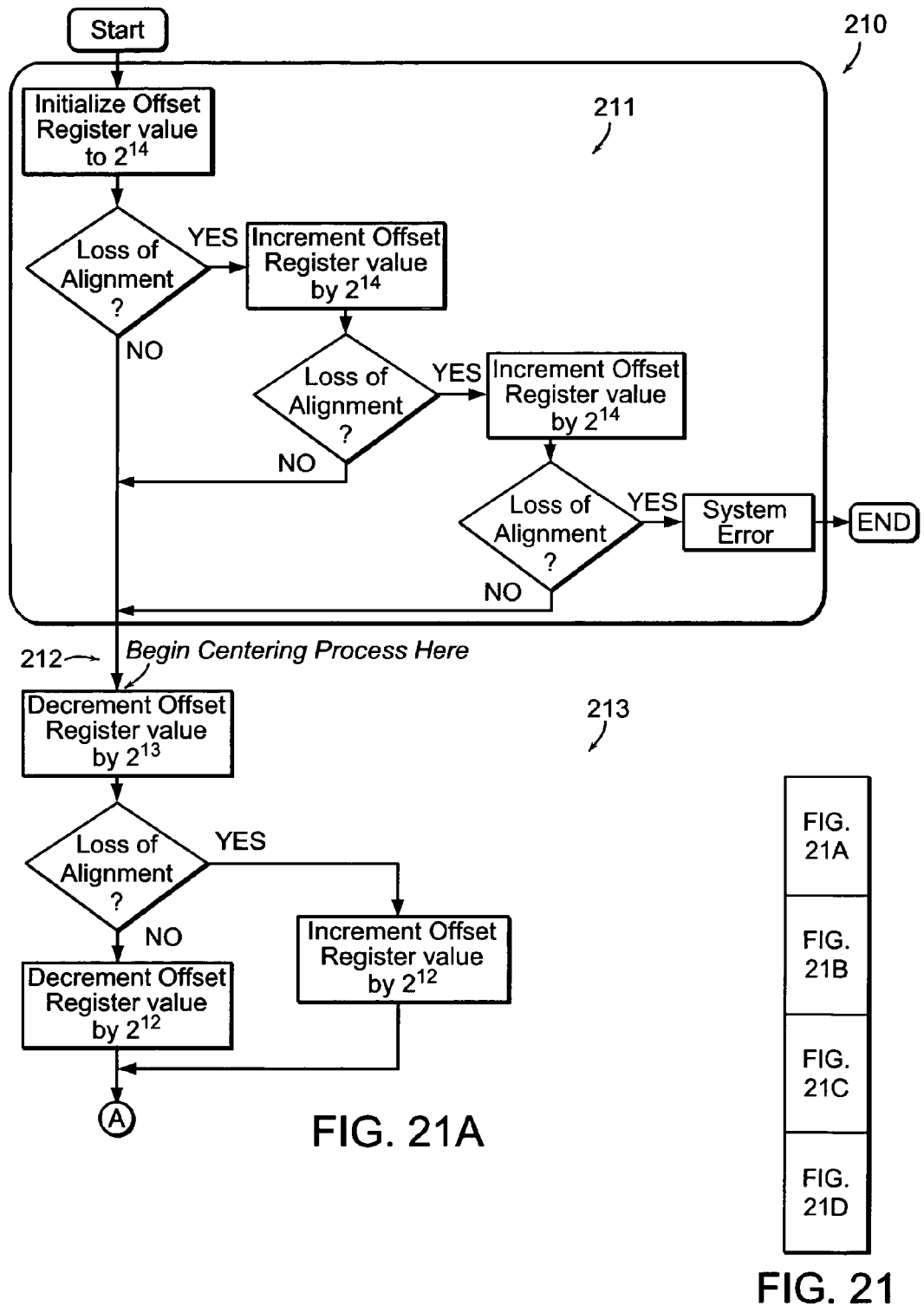
FIG. 21 is a flow diagram of a process used to align the frames between the elements of FIG. 20.
Figure 21B:
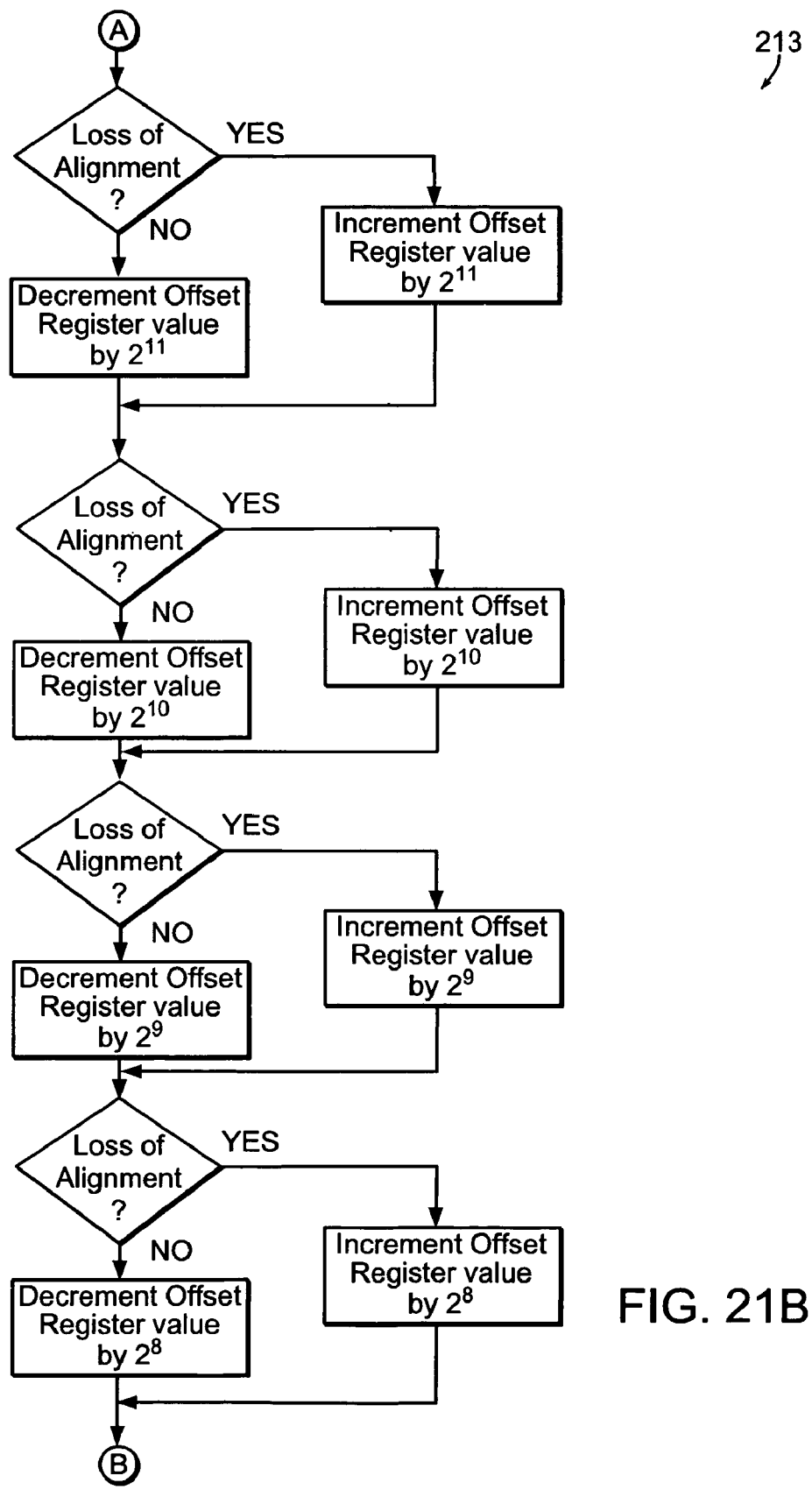
Figure 21C:
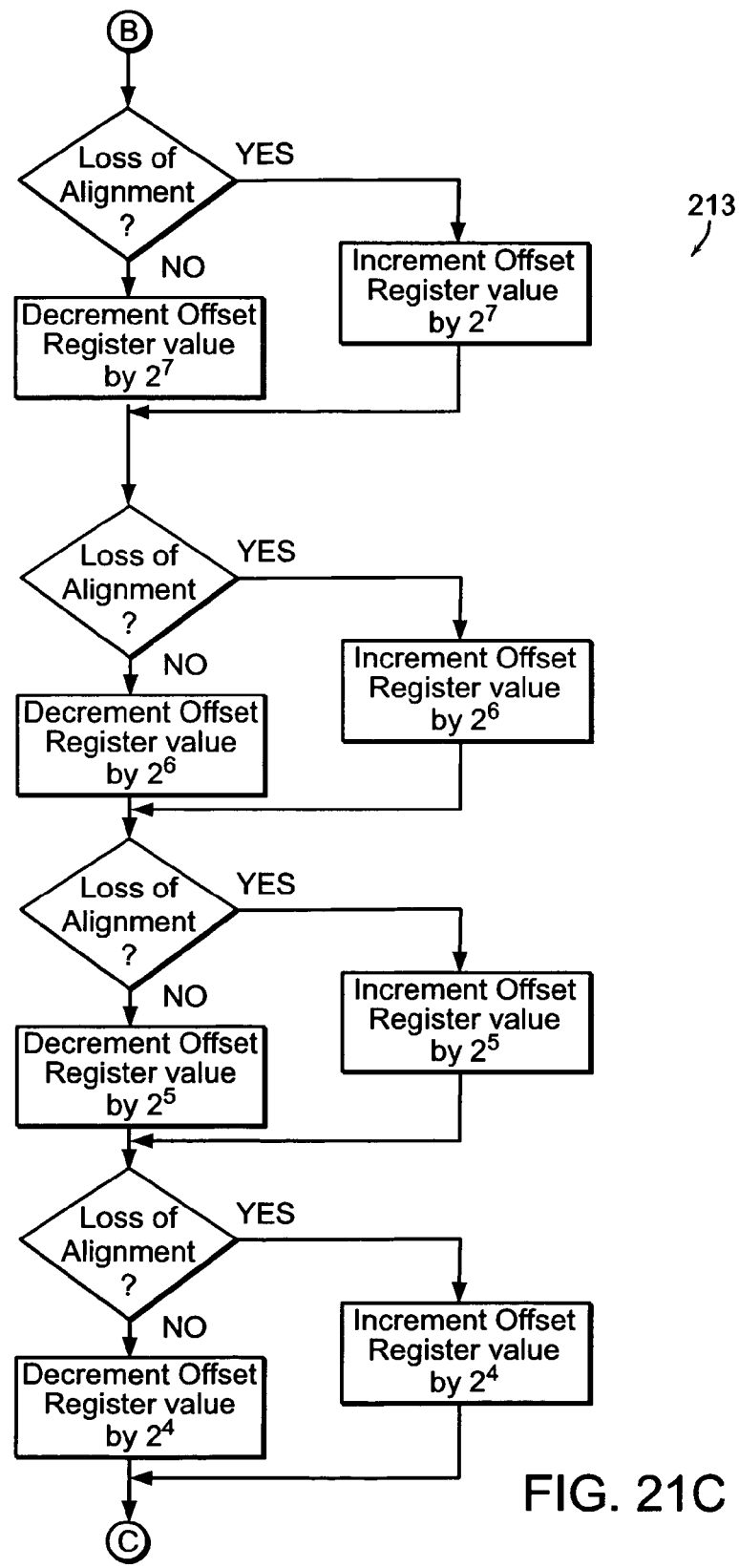
Figure 21D:
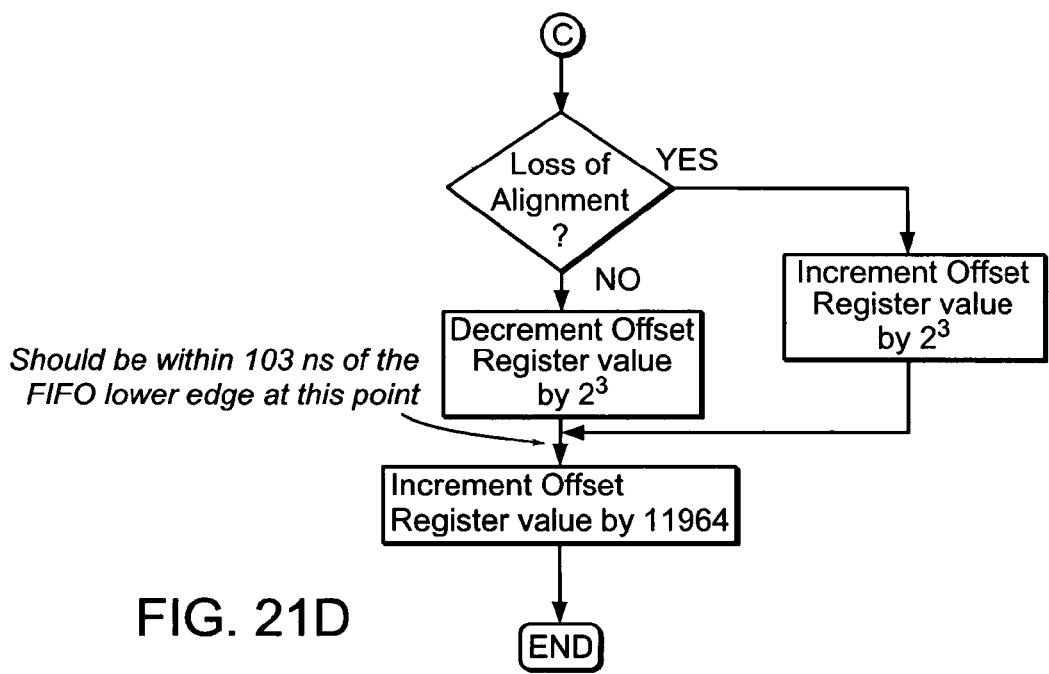
Figure 22A:
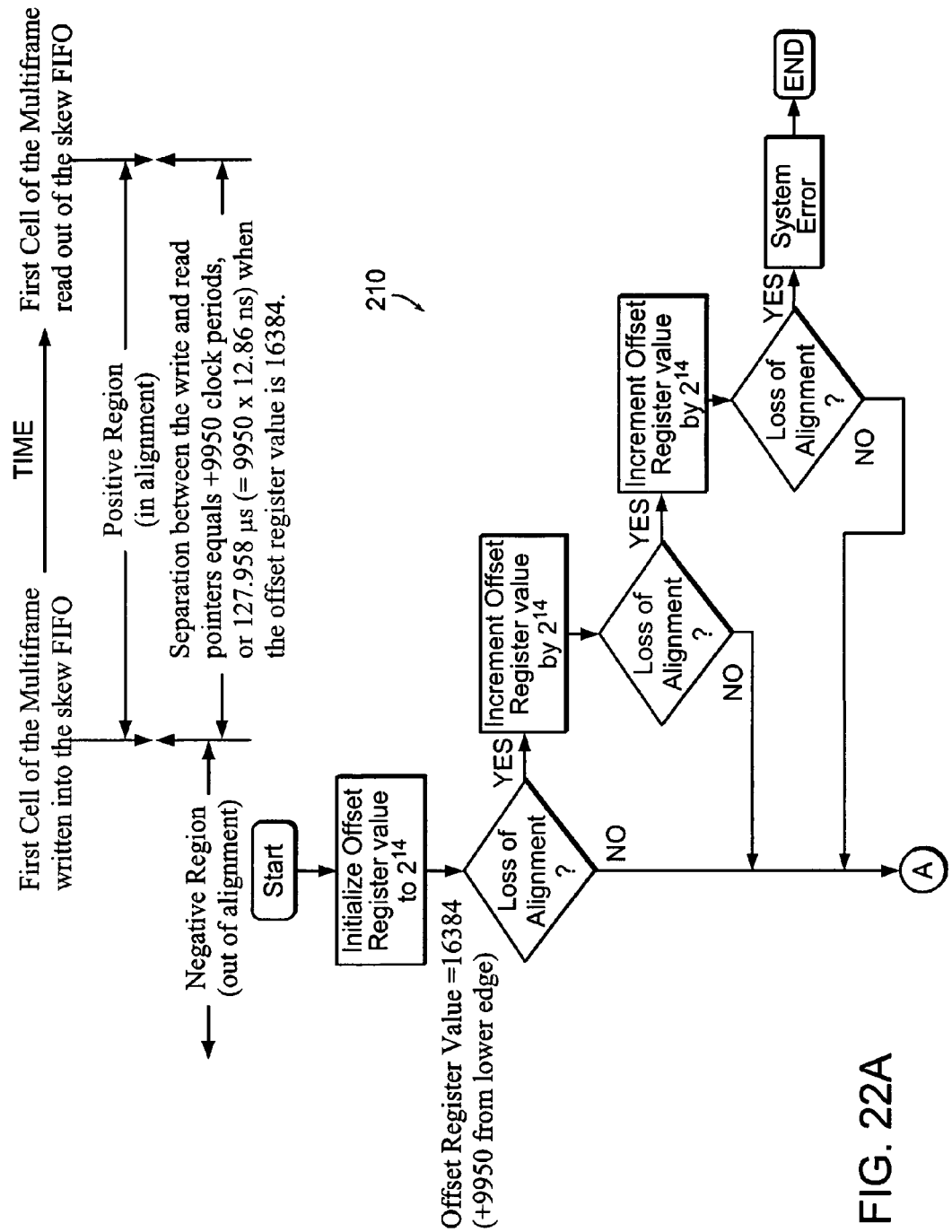
FIG. 22 is an example of the process of FIG. 21.
Figure 22B:
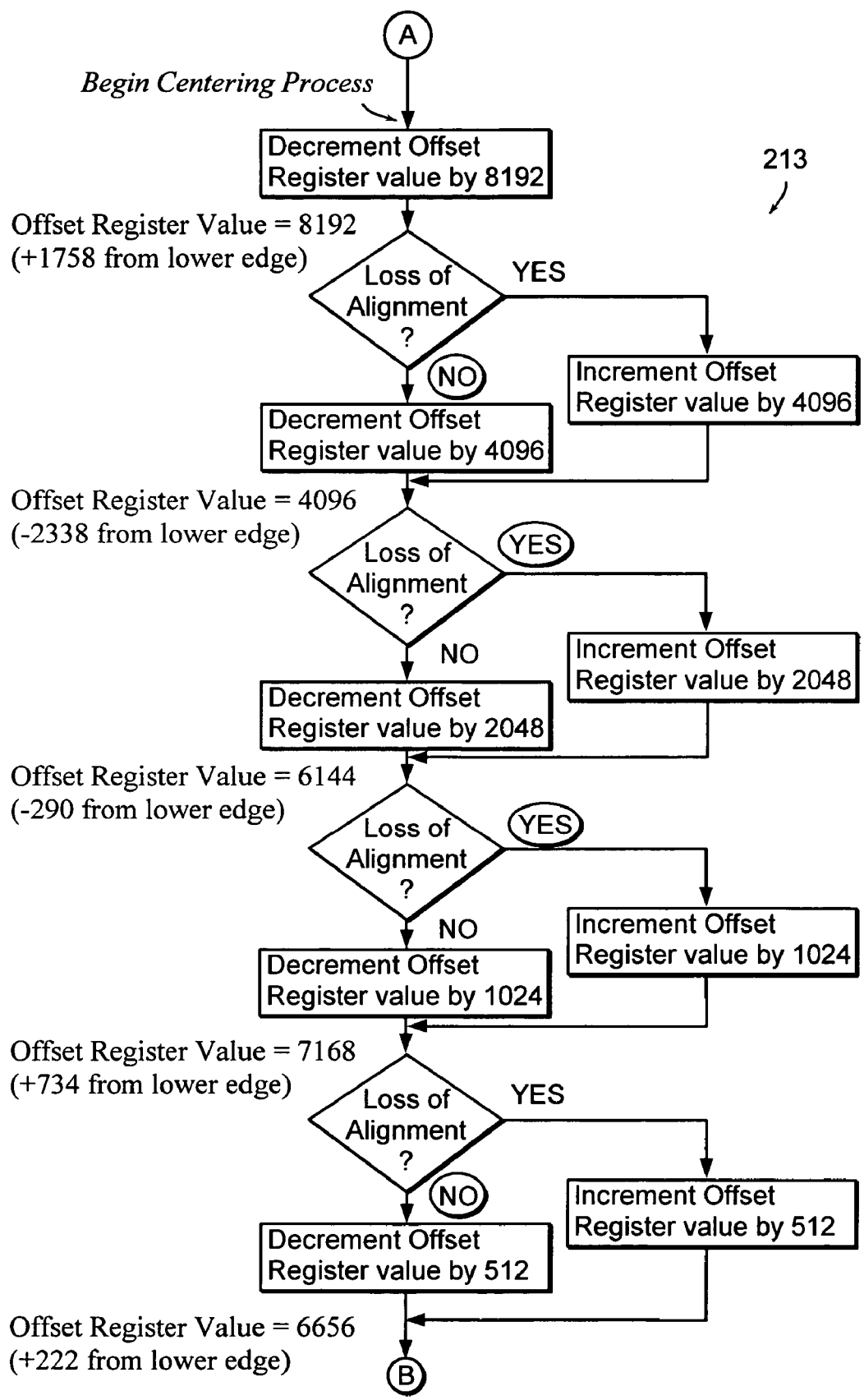
Figure 22C:
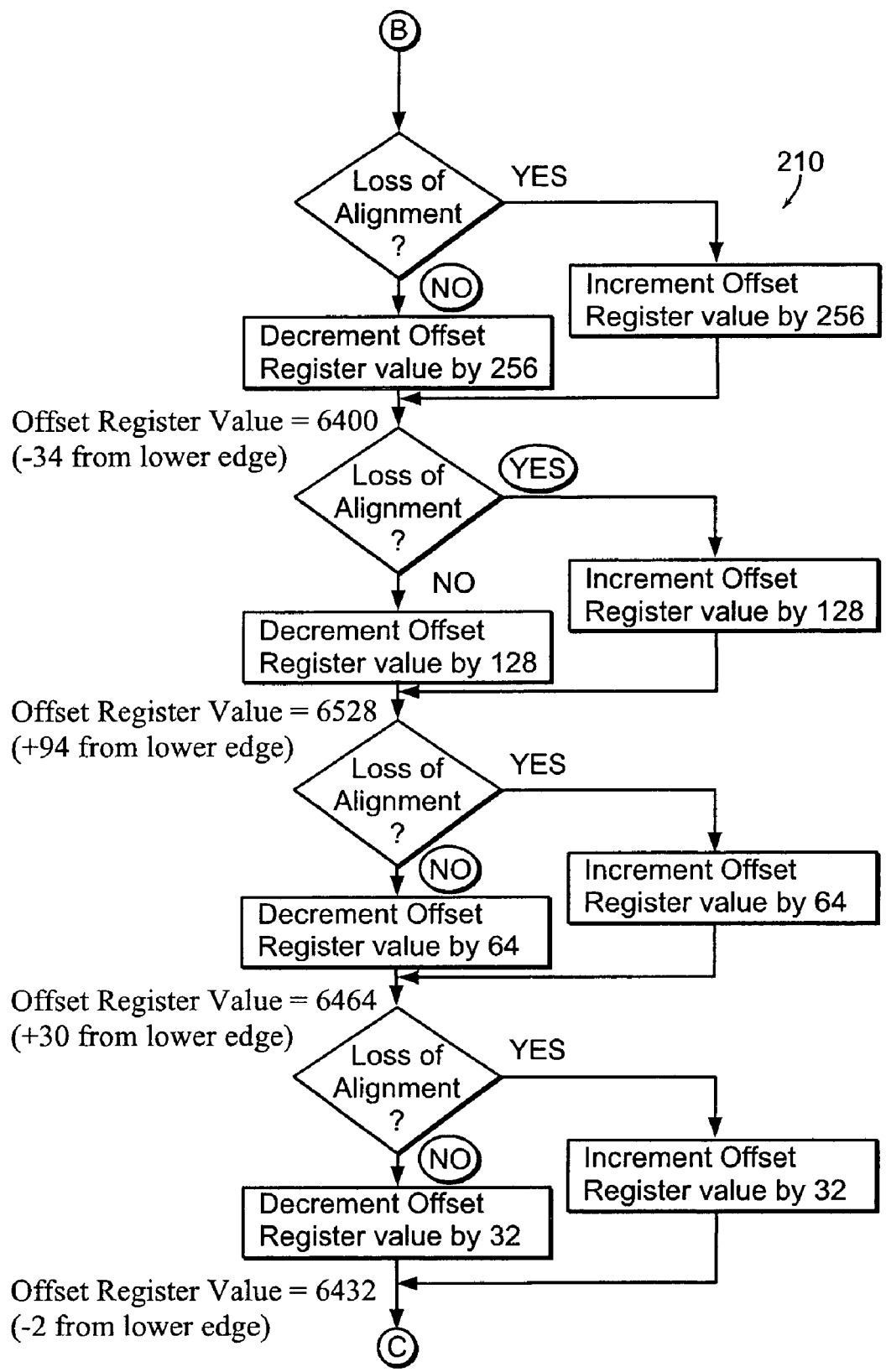
Figure 22D:
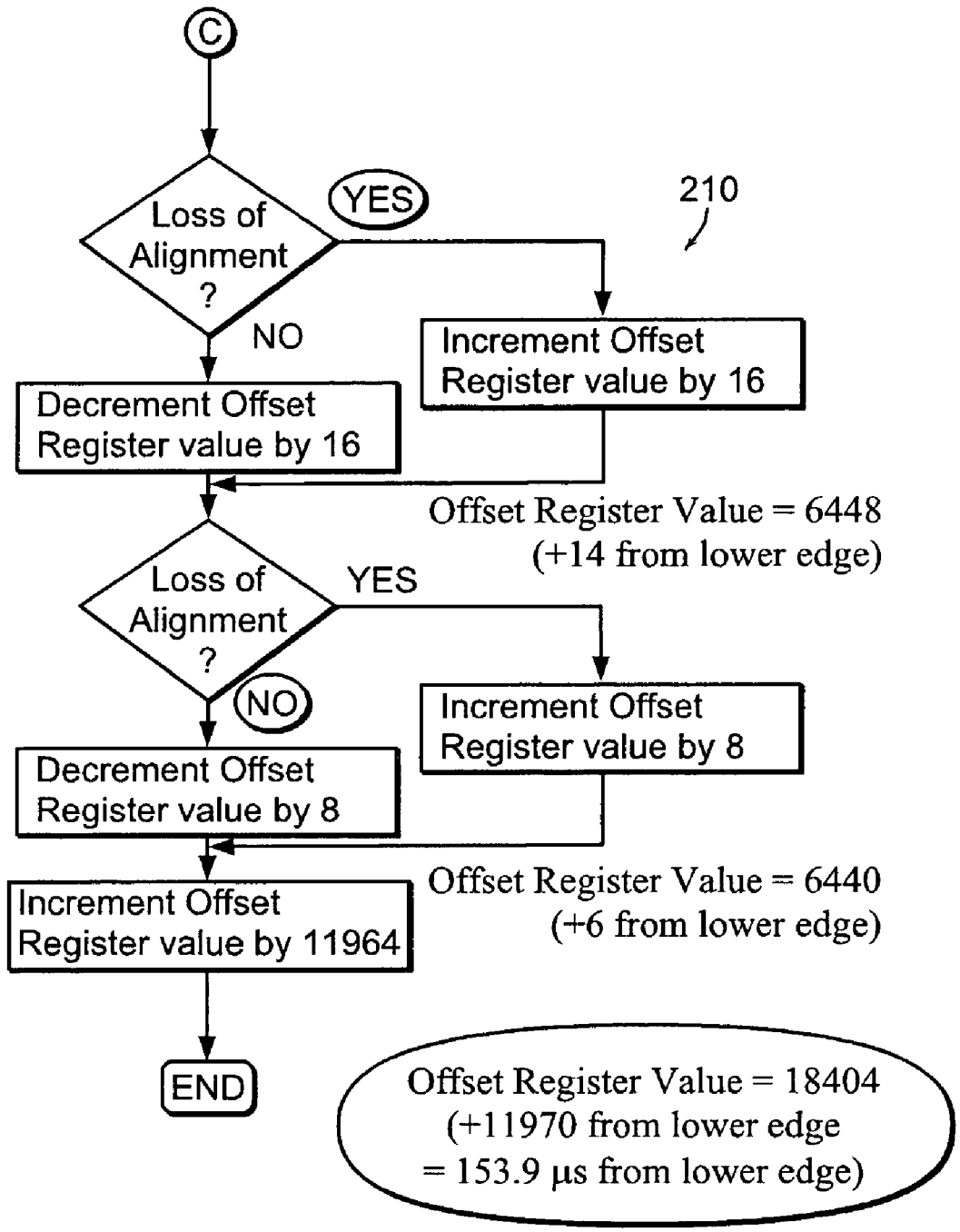

FIG. 20 depicts a simplified view of the hardware components involved with the ingress SONET Link alignment. The hardware may be implemented in software on a single processor in respective network elements 71, 72. In general, firmware running on the NIM adjusts the value of the offset register of the SONET output timer 193 on the NIM 71 until the CSNE 72 clears yellow alarms associated with the SONET Link, thus signifying that the SONET Link is aligned to the skew FIFO on the CSNE 72. Firmware then further adjusts the value of the offset register until the skew FIFO is centered.

There are two yellow alarms returned from the CSNE to the NIM: YELLOW_SONET and YELLOW_SYSTEM_

MFRAME. The CSNE 72 clears the YELLOW_SONET alarm once SONET frame and multiframe alignment has been achieved. This process generally takes no longer than 500 microseconds and occurs regardless of the value of offset register associated with the SONET output timer on the NIM 71. However, each time the value of the offset register of SONET output timer is changed, SONET frame and multiframe alignment at the CSNE 72 is lost, and the framer has to re-establish SONET level alignment. The YELLOW_SYSTEM_MFRAME alarm is used to indicate whether or not the verifier at the output of the CSNE skew FIFO has located the framing pattern within the signal from the NIM. If the SONET output timer on the NIM is set such that the verifier at the output of the skew FIFO cannot locate the framing pattern from the NIM, the NIM is declared out of alignment with respect to the CSNE, and the YELLOW_SYSTEM_MFRAME alarm is activated. Otherwise, the YELLOW_SYSTEM_MFRAME alarm is de-activated.

Referring to FIG. 21, a first process 210 aligns and centers the skew FIFO within 1 cell of center in less than 600 ms. Up to three offset register values are tried (step 211) in order to establish the initial alignment. Once the initial alignment offset register value is found, the FIFO centering process is begun (step 212). Eleven additional offset register updates (steps 213) are required in order to perform the centering process assuming the last two offset register value updates are combined into one offset register update. The idea is to locate the lower edge (i.e., the edge where the skew FIFO becomes empty) of the skew FIFO. This is done by making a series of adjustments such that each subsequent adjustment is half that of the previous adjustment. After running the process 210, the FIFO will be within 103 ns of its center assuming a 77.76 MHz clock is used to clock the SONET output timer on the NIM. If one assumes that there is a delay of 40 ms between offset register adjustments, then the entire alignment algorithm should take 520 ms ($13 \times 40 \times 10^{-3} = 520 \times 10^{-3}$). (This analysis assumes that the skew FIFO in FIG. 20 contains 1920 cells, and that each cell requires 160.26 ns to transmit on the ingress SONET link. Therefore, idealy it takes 153.85 microsceconds ($1920/2 \times 16026$ ns) to half fill the FIFO.)

An example of the execution of the alignment process 210 is shown in FIG. 22. For this example, the initial offset register value of 16384 places the BTM Link 127.958 microseconds away from the lower edge of the FIFO. After running the process 210, the final offset register value is 18404. The difference between the initial offset register value and the final value is 2020. An increase of 2020 causes the pointers to separate by an additional 25.977 microseconds (=2020×12.86 ns). This leaves the FIFO approximately centered at 153.9 microseconds (=127.958+25.977).

Figure 23:
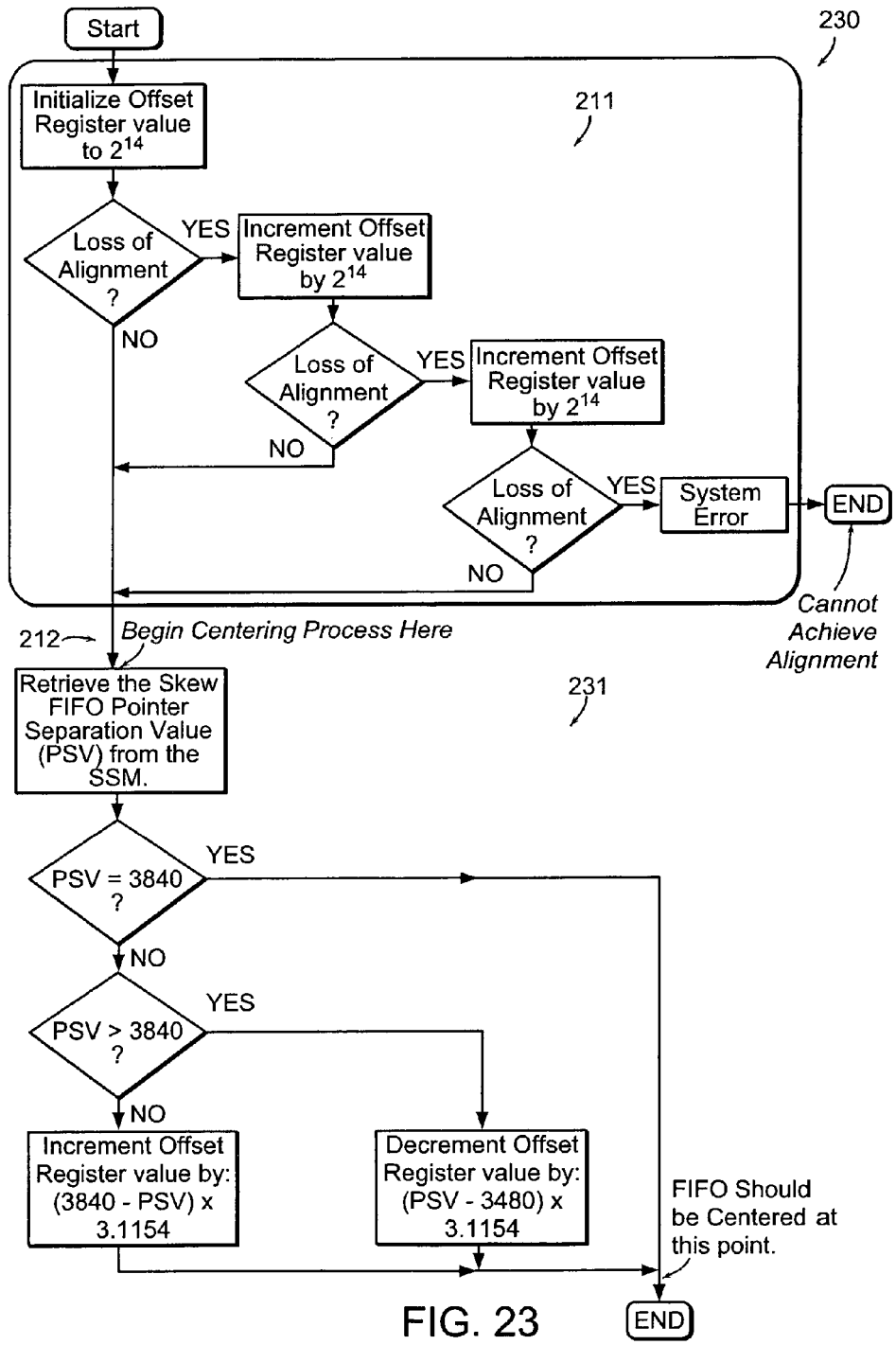
FIG. 23 is a flow diagram of an alternative process of FIG. 21.

Referring now to FIG. 23, the second alignment process 230 is much simpler than the first alignment process 230, but requires some additional hardware capabilities. The additional hardware capability at the CSNE 72 is the ability to send the captured skew FIFO Pointer Separation Value (PSV) down to the NIM, using some of the unused SONET Transport Overhead (TOH) bytes. (The PSV is the difference between the read and write pointers associated with the skew FIFO. The PSV therefore indicates the depth of the FIFO). The additional hardware capability at the NIM is the ability to capture the pointer separation value from the SONET bytes, and store the captured value in a firmware register.

As can be seen when comparing the second alignment process 230 with the first alignment process 210, the non-centering portions 211 are the same. In both processes 230, 210, an initial offset register value must be found that causes alignment to occur. As in the case of the first process 210, for fiber links of length 0 to 40 kilometers, the second process 230 need only try two values to achieve the initial alignment, assuming a fiber propagation delay of 5 ns per meter. A third value is added just in case the fiber propagation delay is significantly different than 5 ns per meter.

Once an initial alignment is achieved, the FIFO needs to be centered. This is accomplished by the CSNE 72 capturing the skew FIFO depth, and sending this captured information down to the NIM. The NIM can then use the skew FIFO depth information to precisely set its SONET output offset register value such that the CSNE skew FIFOs are centered. The entire second process requires no more than three offset register writes (assuming fiber distances no longer than 40 kilometers) and takes no more than 100 ms.

Logic within the CSNE 72 captures the pointer separation value of the skew FIFOs and stores the values in local firmware registers on the CSNE 72. The pointer separation value is captured once every 4 ms. It does this by storing the value of the write pointer at the point in time where the read pointer is at zero. Therefore, the value that is stored represents the difference between the write pointer and the read pointer (i.e., write pointer minus read pointer). There are a total of 7680 locations in each skew FIFO, where each skew FIFO contains 1920 cells, and each cell requires four 128 bit FIFO locations. Therefore, the range of values for the skew FIFO pointer separation is 0 to 7679. In one embodiment, the goal of the centering process is to force the pointer separation value to be 3840, since this is the value of the pointer separation when a skew FIFO is half full (centered). Therefore, as seen in FIG. 23, the pointer separation value is compared to 3840 (step 231). If the pointer separation value is already 3840, then the FIFO is centered and the process 230 is done. If the pointer separation value is not 3840, then the offset register is adjusted by an amount that is equal to the difference between the pointer separation value and 3840. Once this new value is written into the offset register, the FIFO is centered.

Frame Alignment

In a communication network, data is usually passed between network elements using serial communication links. Since the communication links typically operate at the highest possible bit rate allowed by a given technology at a given point in time, very little processing of the signal can be performed at the serial rate, and instead, the signal must be "slowed" down in order to be processed by the network element. This can be accomplished by converting the high-speed serial link to a parallel format. Thus, a signal that is operating at a serial rate of $R_S$ can be slowed down to a parallel rate of $R_P$ by converting the one bit wide serial signal to an N1 bit wide parallel signal. The resulting parallel rate $R_P$ is then equal to $R_S/N1$.

Often, very expensive state-of-the-art circuitry is used to perform this serial to parallel conversion. Once converted to parallel format, the parallel signal is forwarded to a less expensive processing device, such as an Application Specific Integrated Circuit (ASIC) or a Field Programmable Gate Array (FPGA). However, the parallel signal received by the ASIC or FPGA may still be operating at a rate that is too high for the ASIC/FPGA's internal circuitry to process effectively, and therefore, the ASIC/FPGA must slow down the parallel signal to an even slower rate. It does this by creating yet a wider parallel signal. The original N1 bit wide signal is converted to an N2 bit wide signal, where N2 is greater than N1. This results in a signal that operates at a rate that is manageable by the ASIC/FPGA, but one that is quite often a very wide signal.

For instance, a 9.95328 Gbps SONET signal (OC-192) might be processed by an FPGA as a 128 bit wide signal.

Although the 77.76 MHz internal clock rate (9.95328 GHz divided by 128) associated with such a signal is quite manageable for FPGAs, the very wide bus presents challenges in the area known as the framing process.

The framing process is the process of locating a special pattern within the data stream. Once the special "framing pattern" is located, the location of all the other information within the data stream can be identified. A framing pattern such as the SONET framing pattern is a byte oriented framing pattern, which means the framing pattern starts and ends on byte boundaries within the SONET data stream. The SONET framing pattern resides at the start of SONET frame, and repeats every 125 microseconds.

For large values of n (where n is the length of the parallel word processed by the ASIC/FPGA internal circuitry) and m (where m is the length of the searched-for framing pattern contained within a stream of arbitrarily aligned parallel words), a framer/aligner can be implemented with relatively few logic resources by taking advantage of the distinct characteristics of a given framing pattern. For instance, the SONET framing pattern associated with a 9.95328 Gbps SONET signal is 192 bytes of F6 (hexadecimal, H) followed by 192 bytes of 28 (hexadecimal, H). A framer locates the transition between the F6H bytes and the 28H bytes in order to align the incoming parallel word correctly.

Typically, only a small portion of the 384 byte framing pattern is searched for when attempting to locate the transition between the F6H and 28H bytes. For instance, a framer can be implemented that searches for a 48 bit pattern F6F6F6282828H. A 48-bit word may be selected based on a study indicating that 6-8 bytes yields results that balances false detections and errors, where not too many of either are incurred for this size length of framing pattern. Assuming that the parallel word length n is equal to 128 bits and the framer is operating on a 128 bit word, the framing pattern can be located when it straddles the 128 bit word boundary. The 128 bit word may be referred to as the "long word", and its boundaries with respect to an aligned pattern may be referred to as the "long word boundaries".

Figure 24:
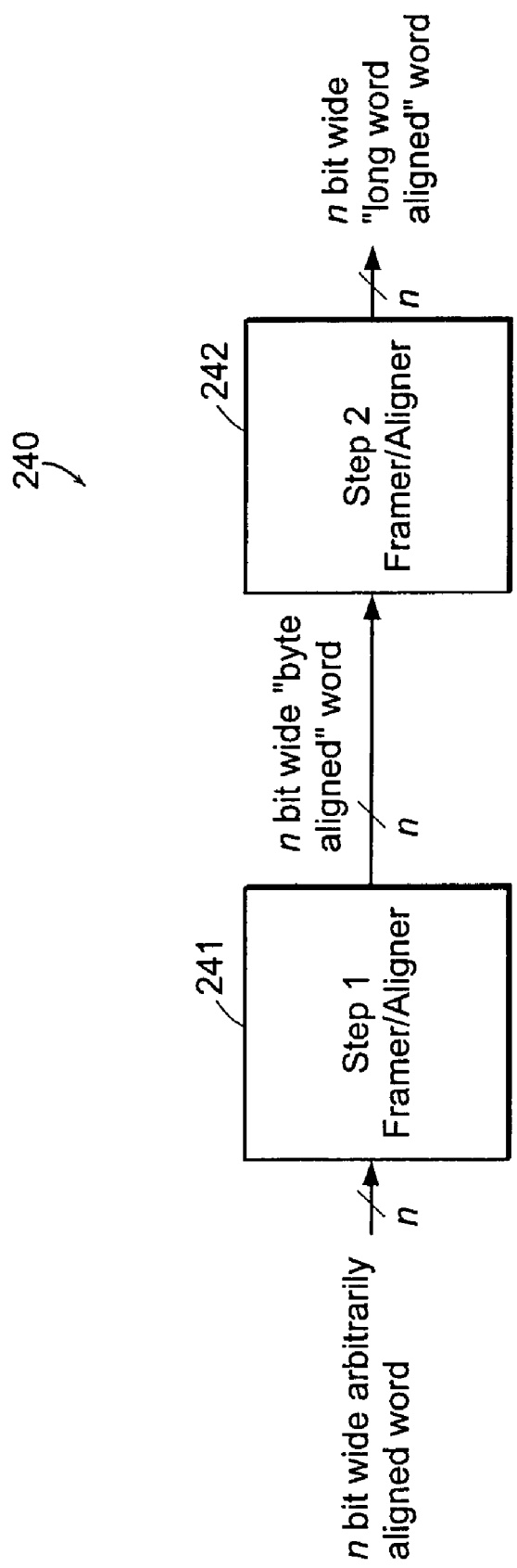
FIG. 24 is a flow diagram of a two-step process used to align frames at the enhanced add-drop elements of FIG. 7.

It is useful to operate on long words within the system such that the long words are aligned to the framing pattern of the OC-192 signal. For instance, since the exemplary long word is 16 bytes long (128/8=16), once aligned, the first 12 long words of the SONET frame each contain sixteen F6H bytes (192/16=12), and the next 12 long words each contain sixteen 28H bytes. In order to perform framing and alignment, a framing circuit or process can first establish byte boundaries within a long word (step 1) and then establish long word boundaries (step 2). In other words, in step 1 (241), byte alignment is performed, and in step 2 (242), long word alignment is performed. A block diagram of this two-step alignment method and apparatus 240 is depicted in FIG. 24.

Byte alignment can be found by looking for consecutive occurrences of the F6H byte based on knowing that there are only eight possible "bit shifted" versions of a sixteen byte F6H pattern. More specifically, during the 192 byte portion of the framing pattern containing the F6H pattern, the 128 bit wide long word may contain:

F6F6F6F6F6F6F6F6F6F6F6F6F6F6F6F6 (i.e., the unshifted pattern)
or 7B7B7B7B7B7B7B7B7B7B7B7B7B7B7B7B (i.e., the F6 pattern right shifted by 1 bit)
or BDBDBDBDBDBDBDBDBDBDBDBDBDBDBDBD (i.e., the F6 pattern right shifted by 2 bits)
or DEDEDEDEDEDEDEDEDEDEDEDEDEDEDEDE (i.e., the F6 pattern right shifted by 3 bits)
or 6F6F6F6F6F6F6F6F6F6F6F6F6F6F6F6F (i.e., the F6 pattern right shifted by 4 bits)
or B7B7B7B7B7B7B7B7B7B7B7B7B7B7B7B7 (i.e., the F6 pattern right shifted by 5 bits)
or DBDBDBDBDBDBDBDBDBDBDBDBDBDBDBDB (i.e., the F6 pattern right shifted by 6 bits)
or EDEDEDEDEDEDEDEDEDEDEDEDEDEDEDED (i.e., the F6 pattern right shifted by 7 bits)

Since there are 192 consecutive F6 bytes in an OC-192 signal, we know that regardless of the incoming alignment there are at least 11 consecutive long words containing sixteen F6 bytes or bit shifted versions of the F6 bytes. Therefore, a detector arbitrarily examines the upper six most bytes (m=48) of an incoming arbitrarily aligned 16 byte long word over an entire SONET frame period and eventually detects one of the eight "6-byte" patterns corresponding to the F6 bytes. Once one of the eight 6-byte patterns is detected, the exact bit alignment of the STS-192 stream with respect to the byte boundaries of the 16 byte long word is known. Based upon this, the entire 128 bit word can be shifted by 1 to 7 bits to achieve internal byte alignment with respect to the SONET framing bytes. The resulted shifted data is then presented to the step 2 aligner (for long word alignment).

Figure 25:
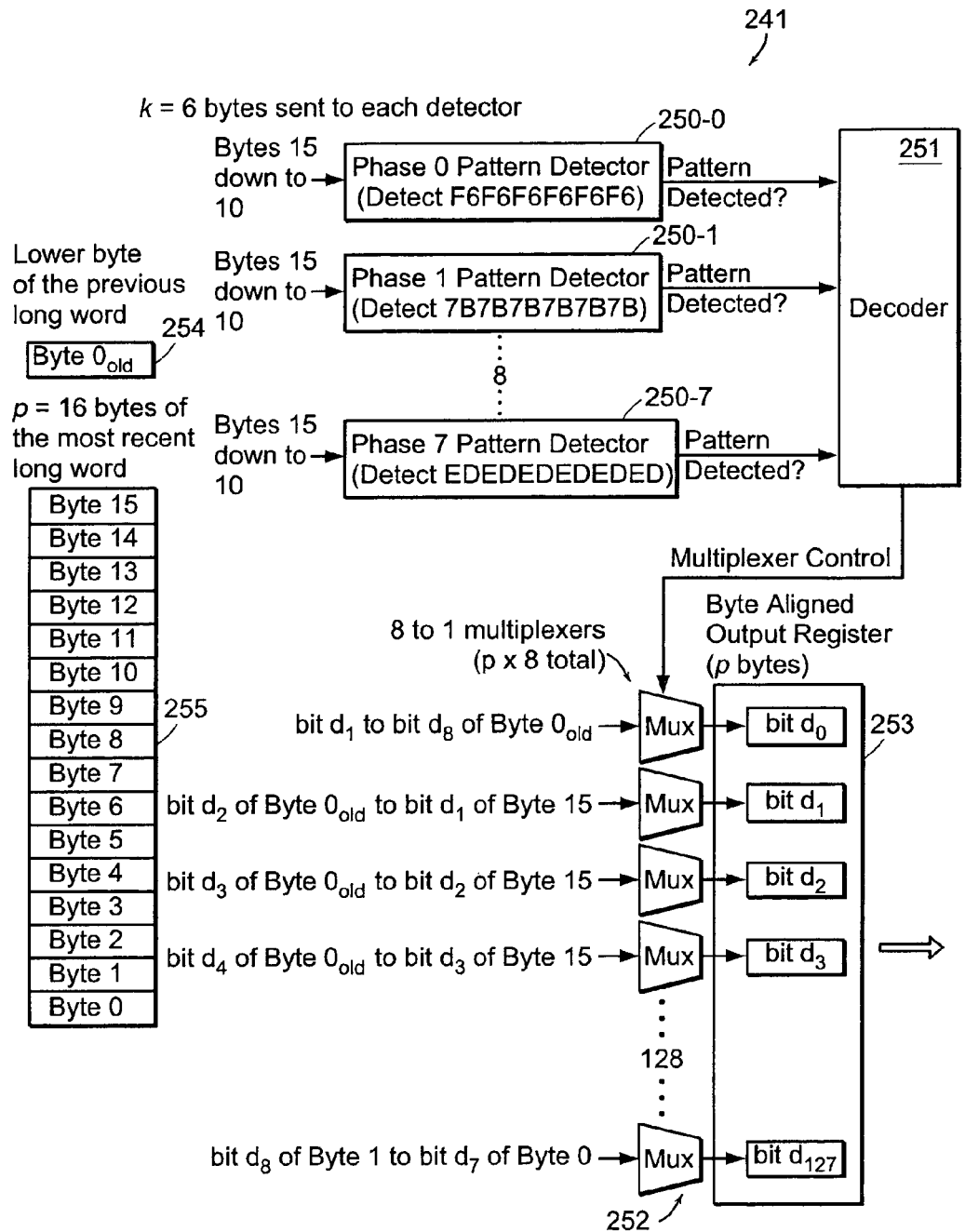
FIG. 25 is a schematic diagram of a circuit used to execute a first step in the two-step process of FIG. 24.

FIG. 25 shows the "Step 1" circuitry 241 associated with the two step framer/aligner 240. In order to byte align the 128 bit long word in the case of OC-192 as described above, once one of the eight patterns has been detected, the lowest byte of the previous long word 254 is stored. Referring to example OC-192 patterns, for a p byte long word and a k byte detected framing pattern, eight pattern detectors 250 of length k bytes are utilized, and 8p eight-to-one multiplexers 252 are employed to implement the step 1 (241) function. A decoder 251 determines which pattern is detected.

Calculations show that a single 48 input pattern detector 250 can be implemented using 16 equivalent logic elements, and a single 8 input multiplexer 251 can be implemented using 5 equivalent logic elements. Therefore, step 1 (241) of the two step framer/aligner 240 with n=128 and m=48 requires a total of 768 equivalent logic elements (=[8×16]+ [128×5]). A data output register 253 is filled with the byte aligned most recently received long word.

Figure 26:
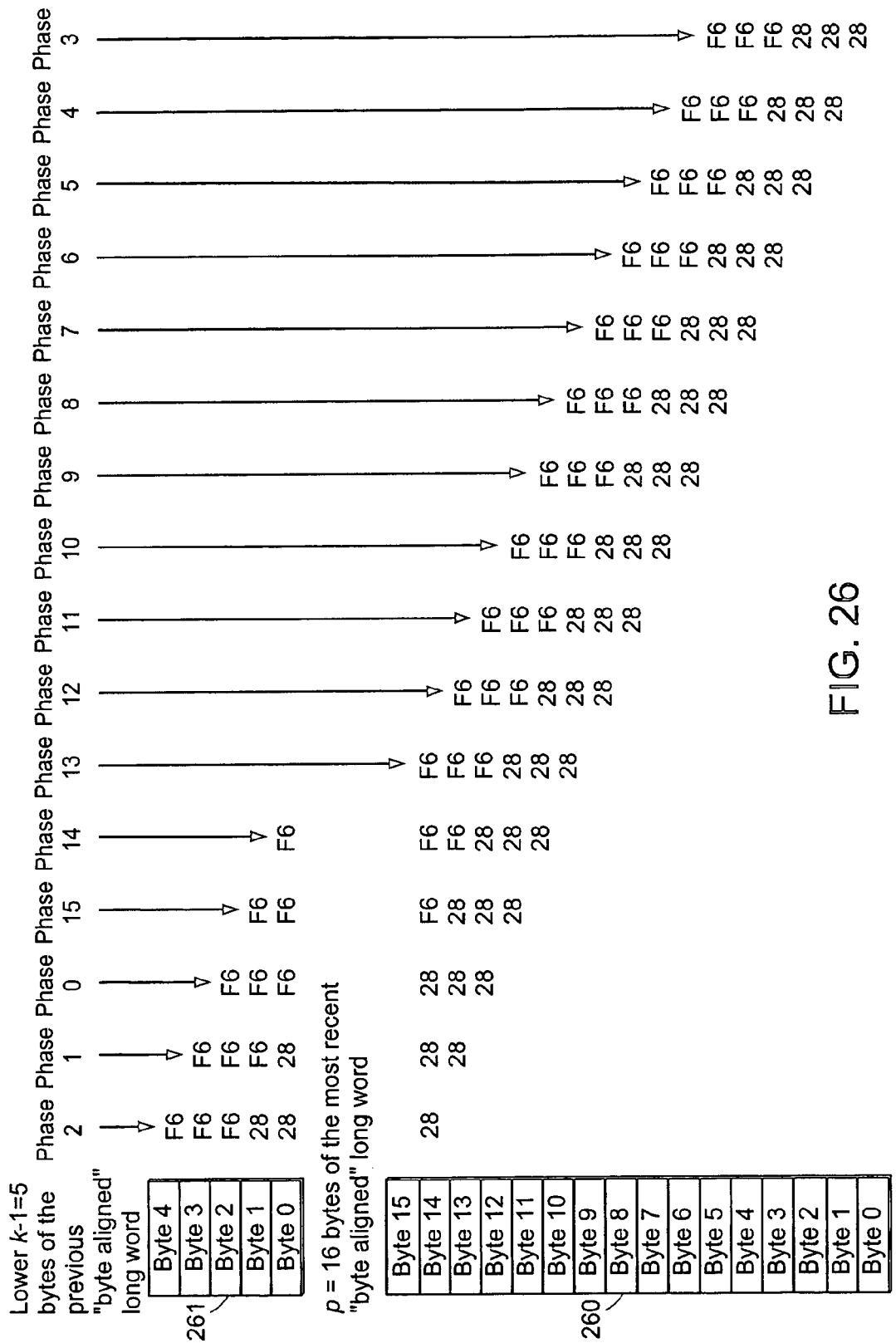
FIG. 26 is a phase diagram of a long word used in a second step of the two-step process of FIG. 24.

Once byte alignment is achieved, long word alignment (step 2) 242 is begun. Referring to FIG. 26, this is done by searching for the six byte pattern, F6F6F6282828 (assuming that m=48) within the "byte aligned" long word received from the step 1 function. Since this pattern may straddle a long word boundary, two registers are needed for the comparison process. One 16 byte register 260 holds the "byte aligned" most recently received long word, and one register holds the previous "byte aligned" long word. Only the most recently received "byte aligned" long word, and the five lowest bytes 261 of the previous "byte aligned" long word are sent to the step 2 pattern detectors. In general, when framing to a k byte pattern, a total of p+k−1 bytes are sent to the step 2 pattern detectors, and a total of p pattern detectors of width 8 k bits are required. Since, byte alignment has already been established, there are only sixteen different positions in which the six byte pattern (F6F6F6282828H) can "end" within the most recently received "byte aligned" long word register. These 16 positions are shown in FIG. 26. It should be noted that in FIG. 26, the Phase 0 alignment is the desired long word alignment. A total of 16 "six byte" samples are compared to the 6 byte pattern. If a pattern match is detected, then the long word boundary has been found, and a byte shift (of 1 to p−1 bytes) can be performed to create a long word that is correctly aligned to the framing pattern within the received SONET signal.

Figure 27:
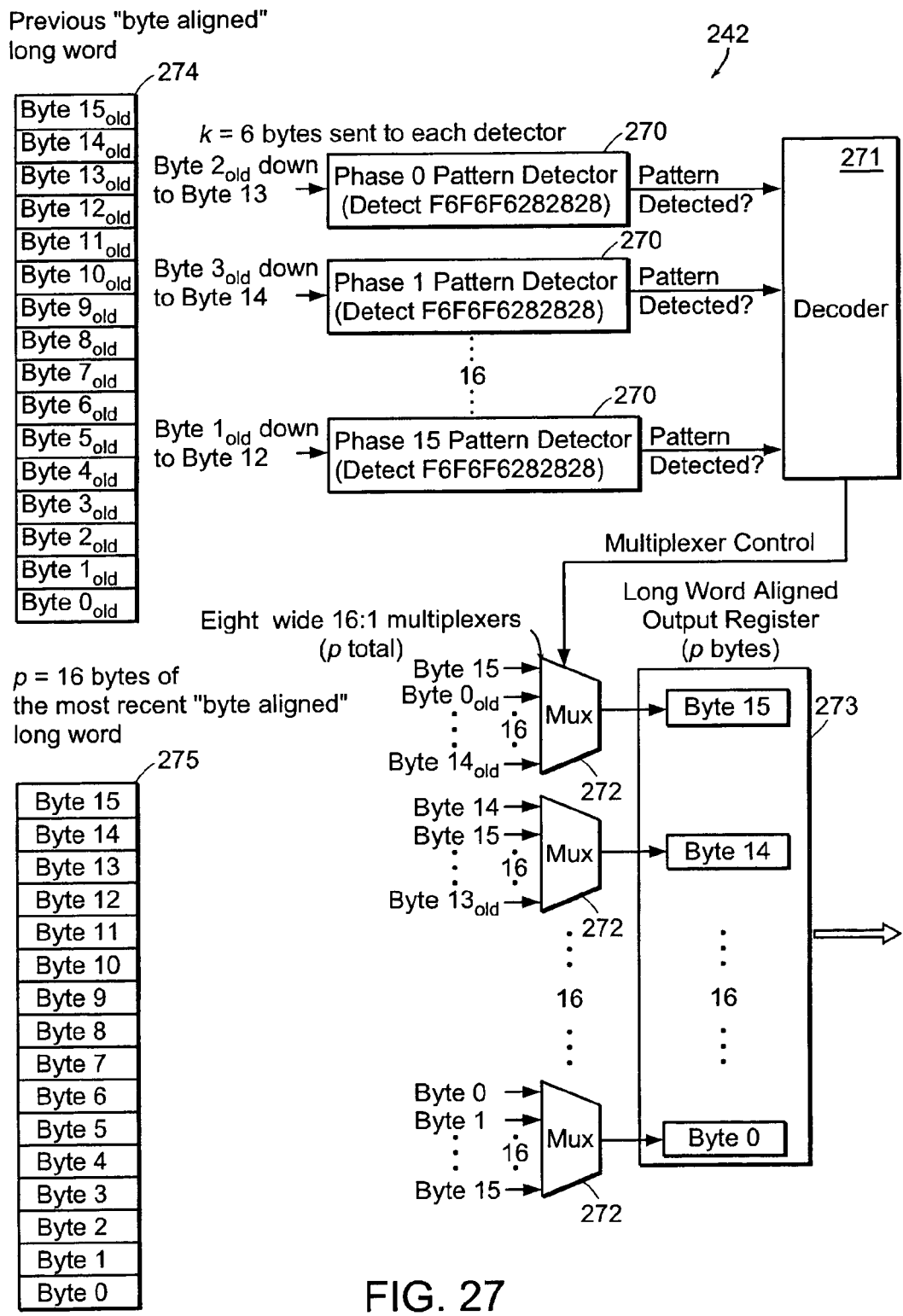
FIG. 27 is a schematic diagram of a circuit used to execute the second step of the two-step process of FIG. 24.

FIG. 27 shows the "Step 2" circuitry 242 associated with the two-step framer/aligner 240. For step 2 of the two-step aligner, 16 pattern detectors 270 are required (when p=16). Each pattern detector 270 compares 48 input bits (when k=6) to the six byte F6F6F6282828H pattern. Therefore, sixteen 48 bit pattern detectors are needed. A decoder 271 is used to decode which phase has been detected and is used to control multiplexers 272. A total of 128 sixteen to 1 multiplexers 272 are required (i.e., 16 eight wide 16:1 multiplexers). In general, p eight-wide p:1 multiplexers 272 are needed for the second step 242 of the two step framer/aligner 240. Calculations show that a single 48 input pattern detector can be implemented using 16 equivalent logic elements, and a single 16 input multiplexer can be implemented using 10 equivalent logic elements. Therefore, step 2 (242) of the two step framer/aligner 240 with n=128 and m=48 requires a total of 1536 equivalent logic elements (=[16×16]+[128×10]).

Since step 1 (241) requires 768 equivalent logic elements and step 2 (242) requires 1536 equivalent logic elements, the entire two step aligner/framer 240 (with n=128 and m=48) requires 2304 equivalent logic elements.

It should be understood that the circuitry (e.g., 170, 1715 (FIG. 17)) described in reference to the central switching network elements 72, enhanced add-drop network elements 71, or other network elements employed for implementing the teachings herein may include software, firmware, or hardware, to execute processes discussed herein. The software may be stored in RAM, ROM, CD-ROM, magnetic disk or other computer-readable media and stored locally or remotely. The software is loaded and executed by general purpose or application specific processor adapted to perform functions associated with the processes.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network node, comprising:
network elements adapted to be interconnected in a network configuration having first and second network boundaries and a network node interior, the interconnected network elements configured to be substantially timing locked in both frequency and phase to a network master timing element, the network master timing element configured to correct phase differences within the first and second network boundaries as a function of a clock signal generated using an external timing source, and configured to transport information between the first and second network boundaries at a given transport rate with uninterrupted data flow with respect to the given transport rate throughout a transition from a state of no faults to a state of at least one soft or hard fault within the network node interior.

2. The network node according to claim 1 wherein the network elements include a plurality of add-drop network elements coupled to two central switching network elements via communications links and wherein a given add-drop network element contains both a source network endpoint where information is added to the network node using tributary inputs and a destination network endpoint where information is dropped from the network node using tributary outputs.

3. The network node according to claim 2 wherein the two central switching network elements reside in the same geographic location.

4. The network node according to claim 2 wherein the two central switching network elements reside in different geographic locations.

5. The network node according to claim 2 wherein the communications links include fiber optic links.

6. The network node according to claim 2 wherein the communications links interconnecting a given add-drop network element and the two central switching network elements are diversely routed.

7. The network node according to claim 2 wherein the add-drop network elements insert information, entering the network node at a given source network endpoint, into connection transport units.

8. The network node according to claim 7 wherein the add-drop network elements further segregate the information into connection transport units as a function of (i) the destination of the information within the network node and (ii) the quality of service metric associated with the information.

9. The network node according to claim 7 wherein each add-drop network element forwards an identical copy of each connection transport unit to each central switching network element, and wherein each central switching network element switches each connection transport unit to one or more output interfaces on the central switching network element such that, in a fault free network, a given destination network endpoint receives two copies of a connection transport unit destined for its destination network endpoint.

10. The network node according to claim 9 wherein if one copy of a given connection transport unit does not arrive at the destination network endpoint from a given central switching network element, the connection transport unit is selected from the other central switching network element.

11. The network node according to claim 9 wherein a given destination network endpoint (i) selects the better of the two identical copies of the connection transport units on a connection transport unit-by-connection transport unit basis and (ii) forwards the information within the selected connection transport unit to a tributary output of the destination network endpoint.

12. The network node according to claim 11 wherein, prior to the selection process, the destination network endpoint of an add-drop network element aligns identical connection transport units from each switch network element with one another.

13. The network node according to claim 12 wherein at least one processor at the central switching network elements and at least one processor at a given destination network endpoint align the connection transport units, wherein:
(i) said at least one processor at the central switching network elements aligns line level information from multiple source network endpoints at the inputs of each central switching network element;
(ii) said at least one processor at the given destination network endpoint aligns line level information from two central switching network elements with each other; and
(iii) said at least one processor at the given destination network endpoint aligns identical connection transport units.

14. The network node according to claim 11 wherein the given destination network endpoint selects between the two identical connection transport units arriving at the given destination network endpoint as a function of an integrity of the information within the two identical connection transport units by using an integrity indicator associated with each connection transport unit or an integrity indicator associated with a group of connection transport units.

15. The network node according to claim 7 wherein the connection transport units are Time Division Multiplexed (TDM) time slots on the communications links between the network elements.

16. The network node according to claim 7 wherein the connection transport units are fixed length packets or cells on the communications links between the network elements.

17. The network node according to claim 7 wherein the connection transport units are variable length packets on the communications links between the network elements.

18. A method for transporting information in a network node, comprising:
providing first and second boundaries of the network node;
transporting information between the first and second boundaries of the network node at a given transport rate with uninterrupted data flow with respect to the given transport rate throughout a transition from a state of no fault to a state of at least one soft or hard fault within the network node; and
correcting phase differences within the first and second network boundaries as a function of a network master timing element and a clock signal generated using an external timing source.

19. The method according to claim 18 further including adding the information to the network node, switching the information in the network node, and dropping the information from the network node.

20. The method according to claim 19 wherein the switching includes switching the information in the same geographical location in the network node.

21. The method according to claim 19 wherein the switching includes switching the information at multiple geographic locations within the network node.

22. The method according to claim 19 wherein transporting the information between the first and second network boundaries includes transmitting the information across an optical link.

23. The method according to claim 22 wherein the optical links are diversely routed.

24. The method according to claim 19 further including inserting the information into connection transport units.

25. The method according to claim 24 wherein inserting the information into connection transport units includes segregating the information as a function of a destination of the information within the network node and a quality of service metric associated with the information.

26. The method according to claim 24 further including forwarding an identical copy of each connection transport unit for switching such that, in a fault free network node condition, two copies of a connection transport unit are received at a destination network endpoint in the network node.

27. The method according to claim 26 further including (i) determining if one copy of a given connection transport unit does not arrive at the destination network endpoint and (ii) selecting the other connection transport unit if the given connection transport unit does not arrive.

28. The method according to claim 26 further including (i) selecting the better of the two identical connection transport units on a connection transport unit-by-connection transport unit basis and (ii) forwarding the information within the selected connection transport unit to an output of the destination network endpoint.

29. The method according to claim 28 further including aligning identical connection transport units with one another prior to selecting the better of the two identical connection transport units.

30. The method according to claim 29 further including a three phase alignment process, comprising:
aligning line level information at a first location in the network node;
aligning line level information at a second location in the network node; and
aligning the two identical connection transport units at a third location in the network node.

31. The method according to claim 28 further including selecting between the two identical connection transport units as a function of an integrity of the information within the two connection transport units by using an integrity indicator associated with each connection transport unit or an integrity indicator associated with a group of connection transport units.

32. The method according to claim 24 wherein the connection transport units are Time Division Multiplexed (TDM) time slots.

33. The method according to claim 24 wherein the connection transport units are fixed length packets or cells.

34. The method according to claim 24 wherein the connection transport units are variable length packets.

35. A network node, comprising:
network elements adapted to be interconnected in a network configuration having first and second network boundaries and a network node interior; and
means substantially timing locked in both frequency and phase to master timing means, for correcting phase differences between the master timing means and the network elements adapted to be interconnected in a network configuration within the first and second network boundaries and as a function of a clock signal generated using an external timing source, and for transporting information between the first and second network boundaries at a given transport rate with uninterrupted data flow with respect to the given transport rate throughout a transition from a state of no faults to a state of at least one soft or hard fault within the network node interior.

* * * * *

UNITED STATES PATENT AND TRADEMARK OFFICE
CERTIFICATE OF CORRECTION

| | | |
|---|---|---|
| PATENT NO. | : 8,320,409 B2 | Page 1 of 1 |
| APPLICATION NO. | : 10/631479 | |
| DATED | : November 27, 2012 | |
| INVENTOR(S) | : Boduch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1323 days.

Signed and Sealed this
Twenty-first Day of October, 2014

Michelle K. Lee
*Deputy Director of the United States Patent and Trademark Office*